(12) United States Patent
Watanabe et al.

(10) Patent No.: US 7,760,446 B2
(45) Date of Patent: Jul. 20, 2010

(54) METHOD OF FIXING OPTICAL MEMBER AND OPTICAL UNIT

(75) Inventors: Sachiko Watanabe, Kawasaki (JP); Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 11/468,179

(22) Filed: Aug. 29, 2006

(65) Prior Publication Data

US 2006/0291076 A1  Dec. 28, 2006

Related U.S. Application Data

(63) Continuation-in-part of application No. 11/282,821, filed on Nov. 21, 2005, now abandoned.

(30) Foreign Application Priority Data

| Dec. 27, 2004 | (JP) | ............................ 2004-376819 |
| Dec. 28, 2004 | (JP) | ............................ 2004-380786 |
| Sep. 14, 2005 | (JP) | ............................ 2005-266993 |

(51) Int. Cl.
*G02B 7/02* (2006.01)

(52) U.S. Cl. ..................................... 359/811

(58) Field of Classification Search ................. 359/156, 359/811; 219/121
See application file for complete search history.

(56) References Cited

U.S. PATENT DOCUMENTS

| 4,742,235 | A   |   | 5/1988  | Koji .......................... 250/504 R |
| 5,152,788 | A   | * | 10/1992 | Isaacson et al. ............... 623/6.13 |
| 5,361,168 | A   |   | 11/1994 | Arai et al. ..................... 359/796 |
| 5,503,694 | A   |   | 4/1996  | Abrams .......................... 156/64 |
| 6,023,448 | A   |   | 2/2000  | Tajiri et al. ................... 369/112 |
| 6,239,925 | B1  | * | 5/2001  | Ardrey et al. ................. 359/819 |
| 6,741,406 | B2  |   | 5/2004  | Kitamura et al. ............. 359/819 |
| 6,962,446 | B2  |   | 11/2005 | Grueb et al. ................... 385/80 |
| 7,057,817 | B2  | * | 6/2006  | Maeda ........................ 359/497 |
| 2002/0005996 | A1 |   | 1/2002  | Kitamura et al. ............. 359/819 |
| 2004/0084444 | A1 | * | 5/2004  | Wang et al. .................. 219/679 |

FOREIGN PATENT DOCUMENTS

| JP | 59-228615   | 12/1984 |
| JP | 62-096915   | 5/1987  |
| JP | 02-024414 U | 2/1990  |

(Continued)

OTHER PUBLICATIONS

Nov. 24, 2006 Korean Official Action (with English-language translation).

(Continued)

*Primary Examiner*—Ricky L Mack
*Assistant Examiner*—Vipin M Patel
(74) *Attorney, Agent, or Firm*—Fitzpatrick, Cella, Harper & Scinto

(57) ABSTRACT

A method of fixing an optical member for fixing the optical member to a supporting member, wherein an intermediate member that is fused upon irradiation light is disposed between the optical member and the supporting member. By irradiating the light that is transmitted through the optical member onto the intermediate member, the intermediate member is fused, and the optical member is fixed to the supporting member.

4 Claims, 22 Drawing Sheets

FOREIGN PATENT DOCUMENTS

| | | |
|---|---|---|
| JP | 06-273651 | 9/1994 |
| JP | 9-95649 | 4/1997 |
| JP | 9-113783 | 5/1997 |
| JP | 11-072678 | 3/1999 |
| JP | 11-344657 | 12/1999 |
| JP | 2001-290063 | 10/2001 |
| JP | 2003-107309 | 4/2003 |
| JP | 2004-020867 | 1/2004 |
| KR | 2001-110205 | 12/2001 |
| TW | 499589 B | 8/2002 |
| WO | WO 01/95001 A1 | 12/2001 |

OTHER PUBLICATIONS

Jan. 26, 2007 Chinese Official Action with English translation.
Taiwanese Official Action (with English partial translation).
Patents Abstracts of Japan, vol. 009, No. 105 (P-354) May 9, 1985 (JP 59-228615, Dec. 22, 1984).
Apr. 5, 2006 European Search Report in European Patent Appln. No. 05258055.
Nov. 26, 2009 European Official Action in European Patent Appln. No. 05258055.2.

\* cited by examiner

FIG. 20
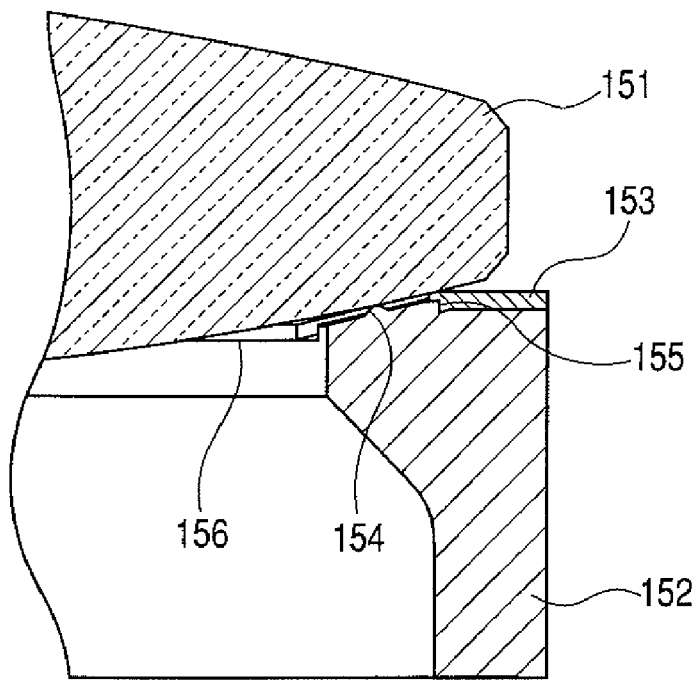
FIG. 21A
FIG. 21B
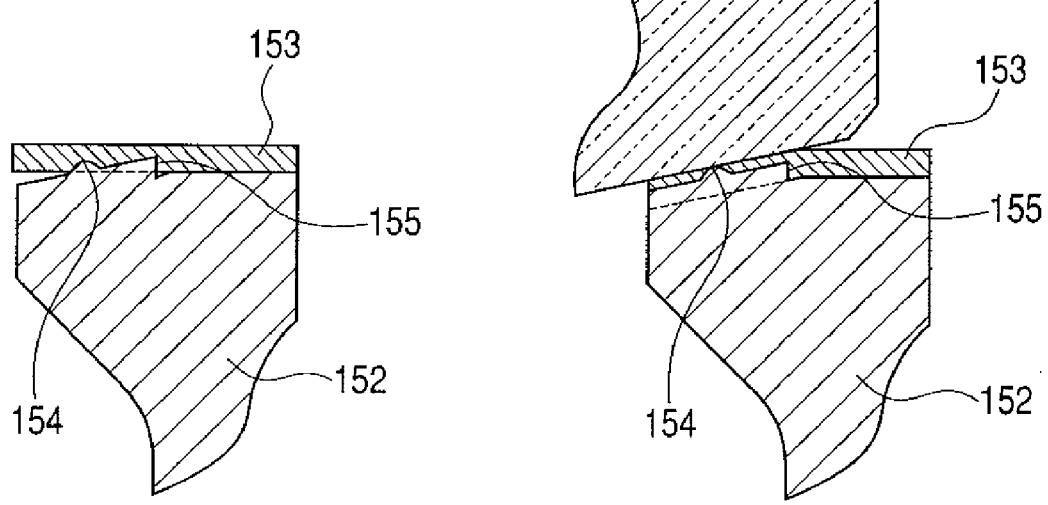

METHOD OF FIXING OPTICAL MEMBER AND OPTICAL UNIT

This application is a continuation-in-part of U.S. Application Ser. No. 11/282,821 filed on Nov. 21, 2005, now abandoned.

BACKGROUND OF THE INVENTION

1. Field of the Invention

The present invention relates to a method of fixing an optical member for fixing the optical member such as an image taking lens to a supporting member or a method of fixing the optical members to each other and also to an optical unit.

2. Description of the Related Art

Conventionally, as a method of fixing a lens to a lens supporting frame for supporting the lens, there is known a method of mounting the lens onto the lens frame made of a resin material and then deforming an outer peripheral end portion of the lens frame by a known method such as heat caulking to thereby fix the lens onto the lens frame.

Besides, a method of fixing an outer peripheral portion of the lens onto the lens frame with an ultraviolet curing adhesive or the like is known.

In addition, as a method of fixing the lens onto the lens frame in which the lens is positioned on a surface of the lens, there is a method of introducing an adhesive in a portion between a side surface of the lens and the lens frame after adjusting the position to adhere the lens onto the lens frame on a side surface of the lens.

Further, a method such that the lens is brought into contact with a welded surface of the lens frame made of a laser absorbing plastic and a laser beam is irradiated onto the welding surface of the lens frame via the lens to fix the lens onto the lens frame is known.

SUMMARY OF THE INVENTION

An aspect of the present invention describes, as a method of fixing an optical member for fixing a second lens onto a first lens, disposing an intermediate member that can be fused by being exposed to light between the first lens and the second lens, and fixing the first lens and the second lens by exposing the intermediate member to the light and thereby fusing the intermediate member.

Other objects and features of the present invention will become apparent from the following description and the attached drawings.

BRIEF DESCRIPTION OF THE DRAWINGS

FIG. 20 is a longitudinal sectional view showing a state where the lens shown in FIG. 19 is fixed to the lens frame via an intermediate member.

FIG. 21A is a longitudinal sectional view showing a state where the intermediate member is incorporated into the lens frame shown in FIG. 19.

FIG. 21B is a longitudinal sectional view showing a state where the intermediate member and the lens are incorporated into the lens frame shown in FIG. 19.

DESCRIPTION OF THE EMBODIMENTS

Best modes for carrying out the present invention are explained below by way of a first embodiment through an eighth embodiment of the present invention.

First Embodiment

Figure 1:
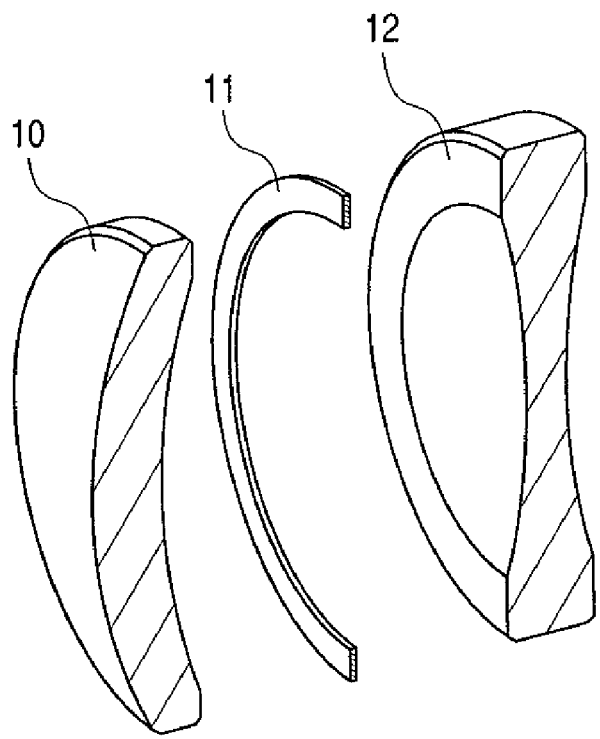
FIG. 1 is a perspective cross-sectional view of a main portion for showing structural components used for a method of fixing an optical member according to a first embodiment of the present invention.

FIG. 1 is a perspective view of a main portion cross section showing structural components used for a method of fixing an optical member according to a first embodiment of the present invention.

In FIG. 1, reference numerals 10 and 12 respectively denote an optical glass lens, and reference numeral 11 denotes an intermediate member made of a sheet material formed in a shape of a circle and intervening between light incidence/emission planes of the lens 10 and the lens 12 at a time of incorporation. The intermediate member 11 is configured with a material not transparent to visible light. The intermediate member 11 also functions as an optical stop that has a function for shielding a reflected harmful light beam from, for example, a peripheral portion or structural components (not shown) other than image taking light beams. The intermediate member 11 is made of a material whose adhesive strength is increased upon application of heat (a material in which a material that significantly absorbs a near-infrared ray (for example, a prescribed coloring material such as carbon black, dye or pigment) is mixed into a thermo-fusing sheet and a thermal adhesive sheet (thermosetting type) containing, for example, polyester, polyimide, polyurethane, ionomer resin, or a copolymer resin of ethylene and methacrylic acid as a main component).

Figure 2:
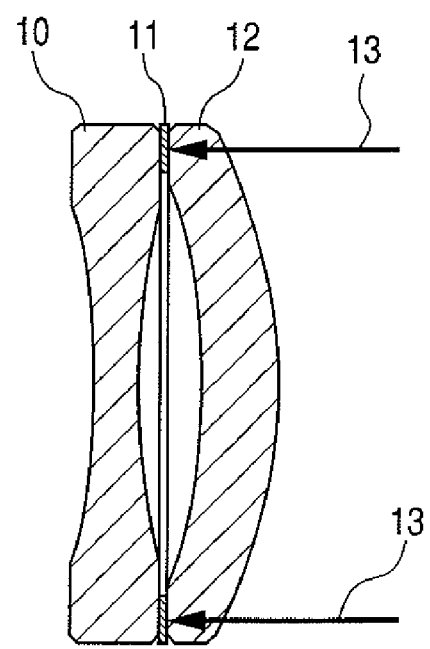
FIG. 2 is a main portion cross sectional view showing a state where a lens is fixed by an intermediate member shown in FIG. 1.

FIG. 2 shows a main portion cross sectional view showing a state where the lens 10, the lens 12, and the intermediate member 11 are incorporated. Reference numeral 13 denotes a laser beam for fixing the lens 10 and the lens 12 by irradiating the near-infrared ray in a manner as described below and thereby increasing the adhesive strength of the intermediate member 11.

In a method of fixing an optical member according to the first embodiment of the present invention, the lens 10 and the lens 12 are fixed in a process as described below.

As described above, in a state where the lens 10 is incorporated with the lens 12 via the intermediate member 11, the lenses 10 and 12 and the intermediate member 11 are brought into close contact with each other by a pressurizing device (not shown). At this time, positions of the lens 10 and the lens 12 between which the intermediate member 11 is held are regulated in a direction orthogonal to an optical axis by a positioning alignment frame (not shown) at peripheral edge portions of the lens 10 and lens 12. Accordingly, the intermediate member 11 is positioned without thrusting into an effective diameter of the lens 10 and lens 12. In this state, a spot-like laser beam 13 is emitted through a light incidence/emission plane of the lens 12 from a laser beam irradiation device (not shown), then is transmitted through the lens 12 and is irradiated onto the intermediate member 11. As described above, the intermediate member 11 is configured with the material that absorbs the near-infrared ray and whose adhesive strength is increased upon application of heat. As a result, the adhesive strength of the intermediate member 11 is instantaneously increased when the intermediate member 11 absorbs the laser beam 13. At this time, the intermediate member 11 is adhered and fixed to the lens 10 and the lens 12. Note that after a prescribed irradiation time, the irradiation of the laser beam is ended, completing a process of fixing the lens.

As described above, the lenses 10 and 12 are directly fixed by heating the intermediate member 11, so the lenses 10 and 12 can be fixed with a high accuracy while saving the space. In addition, a lens frame that supports the lenses 10 and 12 can be downsized.

Note that in a contacting portion between the intermediate member 11 and the lenses 10 and 12, if the press contact between the lenses 10 and 12 and the intermediate member 11 by a pressurizing device (not shown) is released and the positioning alignment frame (not shown) is removed, the lens 10 and the lens 12 are constantly fixed to each other by the adhesive strength of the intermediate member 11. Thus, the lens 10 and the lens 12 are positioned with high accuracy and with no play. Further, such an effect that the lens 10 and the lens 12 are not broken even when an intense impact is applied, by absorbing the impact by an elastic deformation of the intermediate member 11 can be obtained. Thus, the two lenses 10 and 12 remain fixed to the intermediate member 11 in their aligned positions.

In the first embodiment described above, the explanation is made as to such a configuration that the lens 10, the lens 12, and the intermediate member 11 are exposed to the laser beam irradiation in a state in which they are merely incorporated. However, it is needless to say that it is possible to employ such a configuration that the lens 10 is supported by a vacuum suction tool and the like, that the position of the intermediate member 11 is aligned, that eccentricity and inclination of the lens 12 is adjusted, and that the laser beam is irradiated after the alignment with the aligned state being maintained.

According to the first embodiment of the present invention, the laser beam is irradiated in a spot form at a plurality of positions. However, the irradiated positions are not limited to this. The laser beam 13 may be irradiated in accordance with a shape of the intermediate member 11.

In irradiating the spot-like laser beams at a plurality of positions, it is preferable that the laser beams be irradiated with an equal positional interval from one another on the intermediate member 11. If the intermediate member 11 is not formed in a ring-like shape such as a barrel shape, the interval of the irradiation positions may not be equal to each other, that is, the laser beams may be irradiated at intermediation positions of the respective sides of the intermediate member 11. At this time, it is preferable that each of the spot positions be positioned on a circumference of a circle having a center on the optical axis.

Further, the laser beams may be irradiated in a spot form at a plurality of positions at the same time, and if the laser beams are not irradiated at the same time, the laser beams may be sequentially irradiated in a spot form at diagonally arranged positions.

In addition, the fixing may be carried out by rotating the lens 10 and the lens 12 or by rotationally moving the laser beam irradiation positions by, for example, irradiating the laser beams at the same time at three positions at equal intervals (arranged in 120-degree angles with respect to each other) before the direction of the irradiation of the laser beams is rotated clockwise or counterclockwise at an angle of 60 degrees to thereby perform fixing at six positions in total.

In addition to this, the angle of irradiation of the laser beams may be set so that the laser beams are perpendicularly irradiated onto a surface of the intermediate member 11. The laser beams are not necessarily perpendicularly irradiated. The laser beams may be irradiated onto the surface of the intermediate member 11 from other directions.

Further, in the case of the laser beams irradiated at a plurality of portions at the same time, the laser beams may be irradiated with a time difference that does not affect a positional accuracy of the lens 10 and lens 12. In this case, the time difference may be, for example, several tens of milliseconds to several hundreds milliseconds.

It is needless to say that even if the above lens is made of a glass material or of a resin material, the configuration of the lens does not contradict the purpose of the present invention.

In addition, in the method of fixing the optical member as described above, the fixing is carried out on the light incidence/emission plane of the lens, and therefore an outer diameter dimension of the lens does not need to be highly accurately arranged. Accordingly, the lens may be a lens to which a centering process is not carried out. Here, the centering process is a process for finishing the outer diameter of the lens by matching a curvature center of the lens and an outward form center of the lens.

Accordingly, when the lens and the lens frame are fixed to each other by using the method of fixing the optical member of this embodiment, it is not necessary to fix the lens to the lens frame at the outer diameter portion of the lens. Therefore, it is not necessary to form a shape of the lens frame so as to encircle the lens along the outer periphery of the lens frame, thereby making it possible to downsize the lens frame.

Further, the fixing of the lens frame (not shown) and the lens may be carried out by using a conventional method, or by using the method of the present invention by disposing the intermediate member between a lens supporting member and the lens.

In addition, the lenses may be mounted to a lens supporting member after the lenses are fixed to each other by the method of the present invention. Alternatively, one of the lenses may be mounted to the lens supporting member before the other lens is mounted.

The method of fixing the optical member according to this embodiment is hardly subject to influences in terms of the accuracy because the intermediate member 11 is in a sheet-like form with a thickness of several micrometers to several tens of micrometers.

A melting point of the intermediate member 11 is sufficiently lower than those of the lens 10 and lens 12, so the lens 10 and the lens 12 are not subjected to heat influences by the irradiation of the laser beams.

In this embodiment, the positioning of the lens 10 and lens 12 is carried out by surface contact via the intermediate member 11. However, the present invention is not limited to this. It is needless to say that the positioning may be carried out by line contact and point contact.

Second Embodiment

Figure 3:
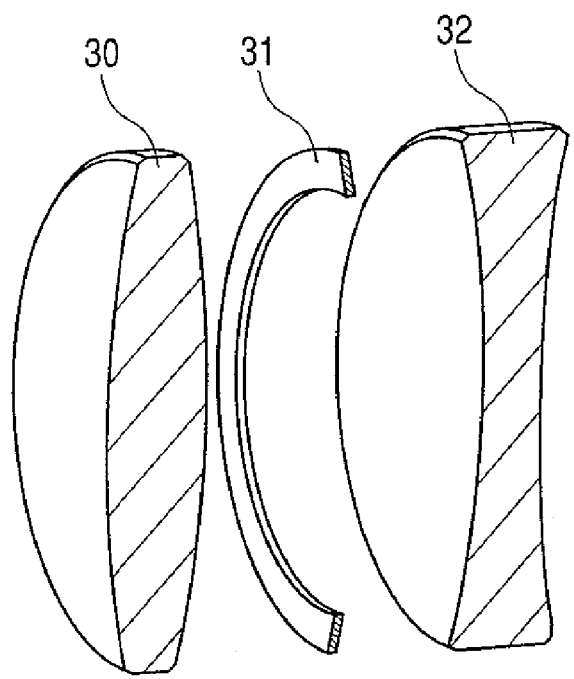
FIG. 3 is a perspective view of a main portion cross section that shows structural components used for a method of fixing an optical member according to a second embodiment of the present invention.
Figure 4:
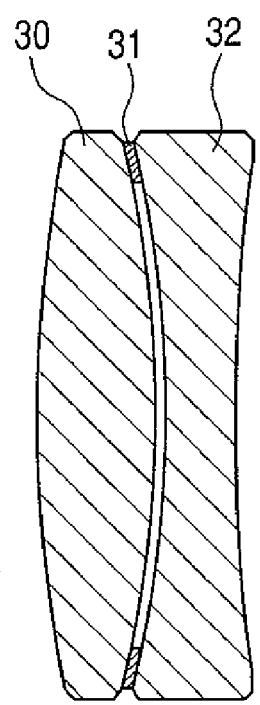
FIG. 4 is a main portion cross sectional view showing a state where a lens is fixed by an intermediate member shown in FIG. 3.

FIG. 3 is a perspective view of a main portion cross section that shows structural components used for a method of fixing an optical member according to a second embodiment of the present invention. FIG. 4 is a cross sectional view showing a state where lenses and an intermediate member are incorporated.

In the second embodiment of the present invention, the same structural components as those of the first embodiment of the present invention are used, and a surface of an intermediate member 31 is shaped along a curvature of a light incidence/emission planes of a lens 30 and lens 32. For example, the intermediate member 31 is formed to be shaped along the curvature of the light incidence/emission planes of the lens 30 and lens 32 after a planar sheet is stamped in a circumferential shape. Thus, the intermediate member 31 is formed so as to come into close contact with the light incidence/emission plane of a lens having irregularities thereon along with the shape of the light incidence/emission plane of the lens without any wrinkle.

The method of fixing the optical member of the second embodiment of the present invention is substantially the same as that of the first embodiment of the present invention, and thus the explanation thereof is omitted.

As described above, the surface of the intermediate member 31 contacting the lens 30 and the lens 32 is formed in a shape along the light incidence/emission plane of the lens 30 and lens 32, so the intermediate member 31 can be readily brought into close contact with the lens 30 and the lens 32, as shown in FIG. 4.

In addition, in the second embodiment of the present invention, the shape of the surface of the intermediate member 31 is formed along the curvature of the light incidence/emission plane of the lens by a method of forming the intermediate member 31 after the sheet-like member forming the intermediate member 31 is stamped. However, the intermediate member 31 is not limited to this configuration. It is needless to say that the shape of the intermediate member 31 may be formed by other methods in order to attain a similar effect.

Figure 5A:
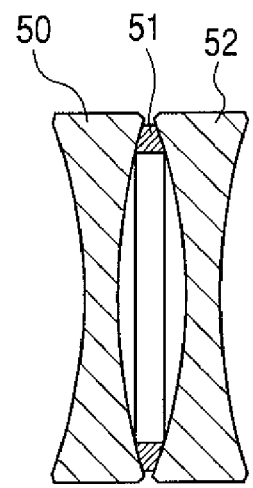
FIGS. 5A, 5B, and 5C are main portion cross sectional views showing examples of various shapes of intermediate members as used in the second embodiment of the present invention.
Figure 5B:
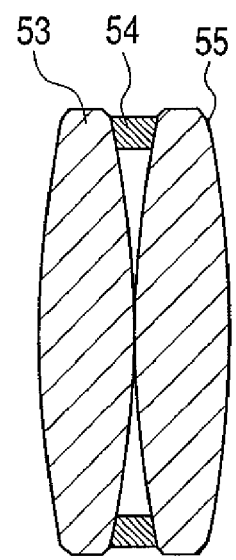
Figure 5C:
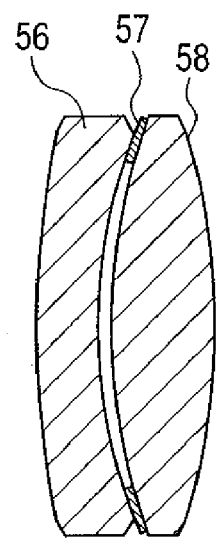

As an example of this case, the lenses of a combination as shown in FIGS. 5A, 5B, and 5C can also be fixed by forming the shape of the intermediate member 31 along with the shape of the lenses to be fixed. FIG. 5A is a cross sectional view of a main portion that shows a state where a concave lens 50 and a concave lens 52 are fixed by an intermediate member 51. FIG. 5B is a cross sectional view of a main portion that shows a state where a convex lens 53 and a convex lens 55 are fixed by an intermediate member 54. FIG. 5C is a cross sectional view of a main portion that shows a state where a concave lens 56 and a convex lens 58, each of which has a curvature different from each other, are fixed by an intermediate member 57.

Here, an explanation is made as to a case where the concave lens 50 and the concave lens 52 are fixed as shown in FIG. 5A, for example. The intermediate member 51 is formed in such a manner that a surface contacting the concave lens 50 and the concave lens 52 is shaped along the curvature of the light incidence/emission plane of the lenses, so the intermediate member 51 can readily be brought into close contact with the concave lens 50 and the concave lens 52. Similarly, also in the case where the convex lens 53 and the convex lens 55 are fixed as shown in FIG. 5B and in the case where the concave lens 56 and the convex lens 58 having a curvature different from each other are fixed as shown in FIG. 5C, the surface of each of the intermediate members 54 and 57 is shaped along the light incidence/emission plane of the lenses, so the intermediate member can readily be brought into close contact with the lenses.

Further, it is needless to say that in order to obtain a similar effect, the shape of the intermediate member may be formed in another shape.

It is needless to say that if the above lens is made of a glass material or of a resin material, the configuration of the lens does not contradict the purpose of the present invention.

The lens may be a lens to which the centering process is not carried out.

Third Embodiment

Figure 6:
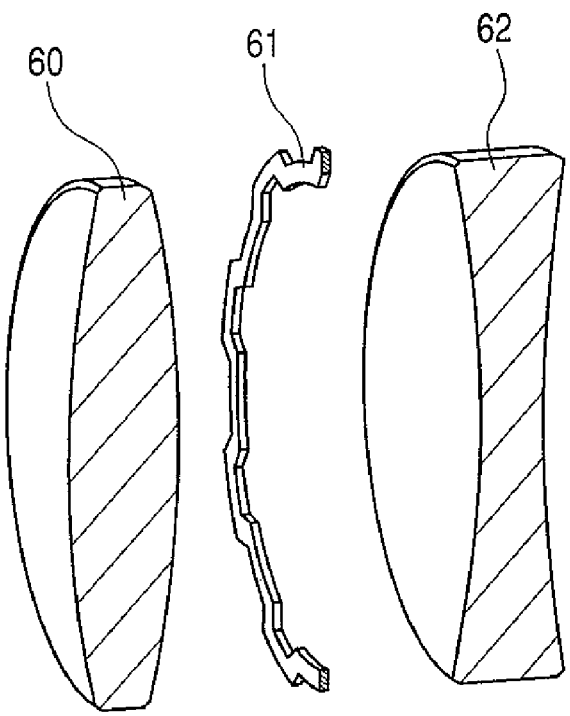
FIG. 6 is a perspective cross-sectional view of a main portion for showing structural components used for a method of fixing an optical member according to a third embodiment of the present invention.

FIG. 6 is a perspective view of a main portion cross section showing structural components used for a method of fixing the optical member according to a third embodiment of the present invention.

The method of fixing the optical member of the third embodiment of the present invention is identical to that of the first embodiment of the present invention, so the explanation thereof is omitted.

Figure 7:
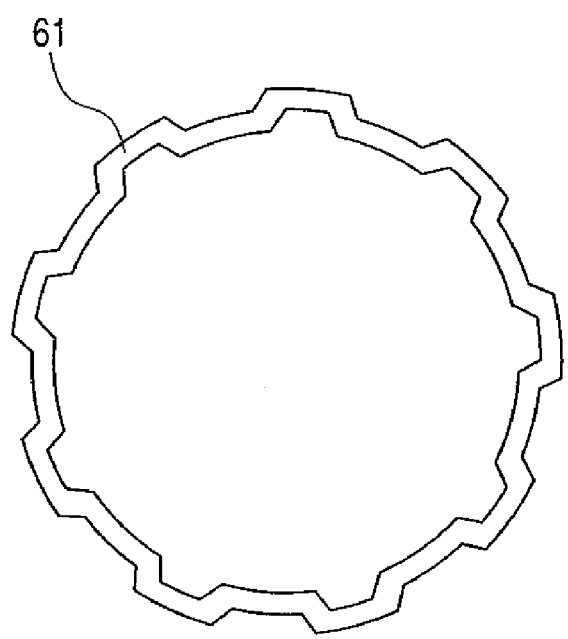
FIG. 7 is a plan view showing an example of a shape of an intermediate member as used in the third embodiment of the present invention.

An intermediate member 61 used in the third embodiment of the present invention has, as shown in FIG. 7, a notched portion in its outer periphery portion and inner periphery portion, respectively. Accordingly, the intermediate member 61 can readily be brought into contact with the light incidence/emission plane of a lens 60 and lens 62 having irregularities thereon along with the shape of the light incidence/emission plane of the lens without any wrinkle.

Figure 8A:
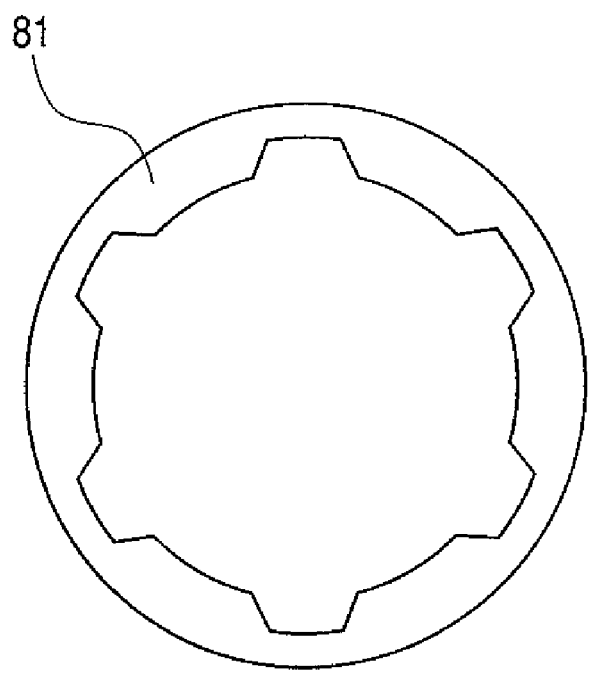
FIGS. 8A and 8B are plan views that respectively show an example of a shape of another intermediate member as used in the third embodiment of the present invention.
Figure 8B:
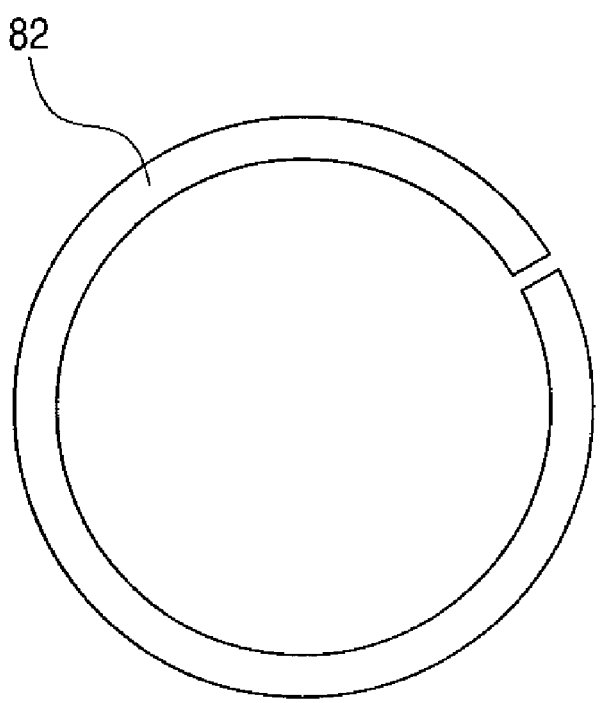

In addition, in the third embodiment of the present invention, the close contact of the intermediate member 61 to the lenses is obtained by forming the notched portion in each of the outer periphery portion and the inner periphery portion of the intermediate member 61. However, it is needless to say that the notched portion may be shaped in another form. FIGS. 8A and 8B show some of other examples of another shape of the notched portion and a shape of a cut portion. FIG. 8A shows one example of the shape of the notched portion, and FIG. 8B shows one example of the shape of the cut portion.

The lenses 60 and 62 and the intermediate member 61 may be disposed so that whole surfaces thereof come into contact with each other. Further, the lenses 60 and 62 and the intermediate member 61 may be disposed so that some parts thereof come into contact with each other. In addition, if the thickness of the intermediate member 61 is set in accordance with an air distance between the lenses, the air distance between the lenses can be aligned without using a spacer or the like.

Fourth Embodiment

Figure 9A:
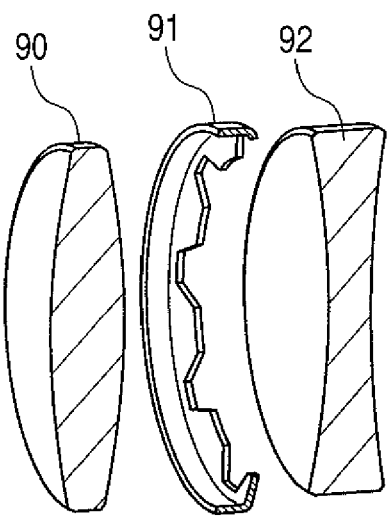
FIG. 9A is a perspective cross-sectional view of a main portion showing an example of a shape of an intermediate member used for a method of fixing an optical member according to a fourth embodiment of the present invention.
Figure 9B:
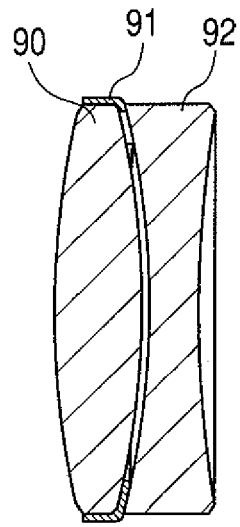
FIGS. 9B and 9C are main portion cross sectional views that respectively show a state where a lens is fixed by an intermediate member according to the fourth embodiment of the present invention.
Figure 9C:
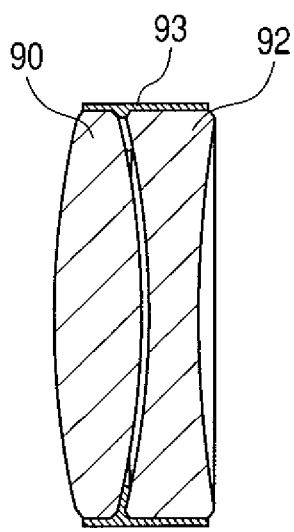

FIG. 9A is a perspective view of a main portion cross section showing structural components used for a method of fixing the optical member that is a fourth embodiment of the present invention, and FIGS. 9B and 9C are main portion cross sectional views each showing a state where a lens is fixed by an intermediate member. FIG. 9A is a view showing a lens 90, a lens 92, and an intermediate member 91, FIG. 9B is a view showing a state after the fixation thereof, and FIG. 9C is a view showing a state after the lens 90 and the lens 92 are fixed by using an intermediate member 93 of another form.

In the fourth embodiment of the present invention, the same structural components as those in the first embodiment of the present invention are used, and the intermediate members 91 and 93 are shaped in such a form as to encircle the lens 90 or in such a form as to encircle an outer peripheral surface of the lens 90 and lens 92.

The method of fixing the optical member of the fourth embodiment is identical to that of the first embodiment of the present invention, so the explanation thereof is omitted.

As shown in FIG. 9A, the intermediate member 91 used in the fourth embodiment of the present invention is shaped in a form along the shape of the surface of light incidence/emission planes of lens 90 and the lens 92, and is formed so as to encircle an outer peripheral end surface of the lens 90. Accordingly, as shown in FIG. 9B, the lens 90 and the lens 92 are fixed by the intermediate member 91, and the intermediate member 91 has a light shielding effect for shielding the light beam other than effective light beams such as stray light from the outer peripheral end surface of the lens 90.

The intermediate member 91 is provided with the cut portions, so the intermediate member 91 can readily be brought into close contact with the lens surface having irregularities thereon along with the shape of the surface of the light incidence/emission plane of the lens 90 and the lens 92 without any wrinkle.

Further, in a case where the intermediate member is shaped in such a form as to encircle the outer peripheral surface of the lens 90 and lens 92 like the intermediate member 93 shown in FIG. 9C, the lens 90 and the lens 92 are fixed by the intermediate member. As well, in this case, the intermediate member has a light shielding effect with respect to the lens outer peripheral end surface of the lens 90 and lens 92 to thereby shield light such as the stray light from the lens outer peripheral end surface of the lens 90 and lens 92.

Fifth Embodiment

Figure 10:
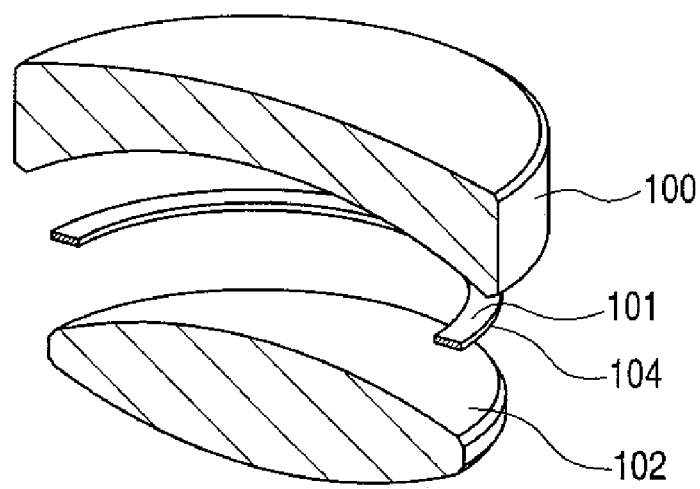
FIG. 10 is a perspective view of a main portion cross section showing structural components used for a method of fixing an optical member according to a fifth embodiment of the present invention.

FIG. 10 is a perspective view of a main portion cross section showing structural components used for a method of fixing the optical member according to a fifth embodiment of the present invention. In FIG. 10, reference numerals 100 and 102 each denote a lens. Reference numeral 101 denotes an intermediate member formed in a ring shape that intervenes between the lens 100 and the lens 102 at the time of incorporation. Reference numeral 104 denotes an outer peripheral end portion of the intermediate member 101.

In the fifth embodiment of the present invention, the same structural components as those of the first embodiment of the present invention are used, and a fixing position of the lens 100 and the intermediate member 101 is positioned at a position different from fixing positions of the lens 102 and intermediate member 101.

Figure 11A:
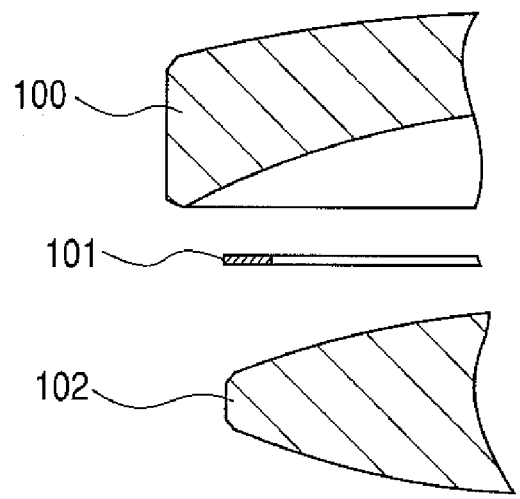
FIG. 11A is a main portion cross sectional view showing a state before a lens is fixed by an intermediate member shown in FIG. 10.
Figure 11B:
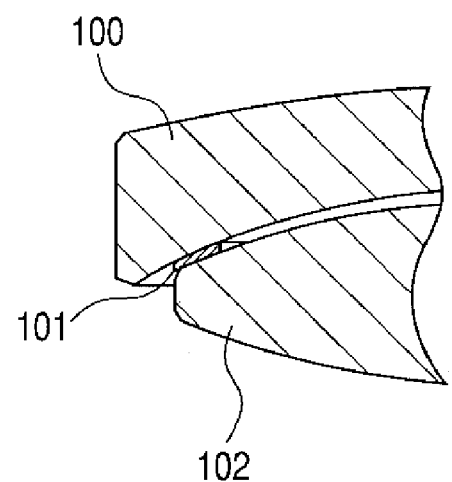
FIG. 11B is a main portion cross sectional view showing a state after a lens is fixed by an intermediate member shown in FIG. 10.

For example, the lens 100 and the lens 102 that are fixed by the method of this embodiment are different from each other in outer diameter, as shown in FIG. 10. The diameter of the outer peripheral end portion 104 of the intermediate member 101 is set to be a value that is substantially approximate to an outer diameter of the lens 102. Accordingly, the intermediate member 101 is positioned so that the outer peripheral end portion 104 of the intermediate member 101 matches the outer peripheral end portion of the lens 102. FIGS. 11A and 11B each show a state where the lens 100 and the lens 102 are fixed by the intermediate member 101. FIG. 11A is a view showing a state before the positioning and the fixing by the intermediate member 101. FIG. 11B is a view showing a state after the positioning and the fixing by the intermediate member 101. As shown in FIG. 11A, the intermediate member 101 is in a planar shape before being positioned, while after the intermediate member 101 is positioned, the shape of the intermediate member 101 is formed along a curvature of a light incidence/emission plane of the lens 100 and lens 102, as shown in FIG. 11B.

In the method of fixing the optical member according to the fifth embodiment of the present invention, the lens 100 and the lens 102 are fixed in accordance with steps described below.

Figure 12A:
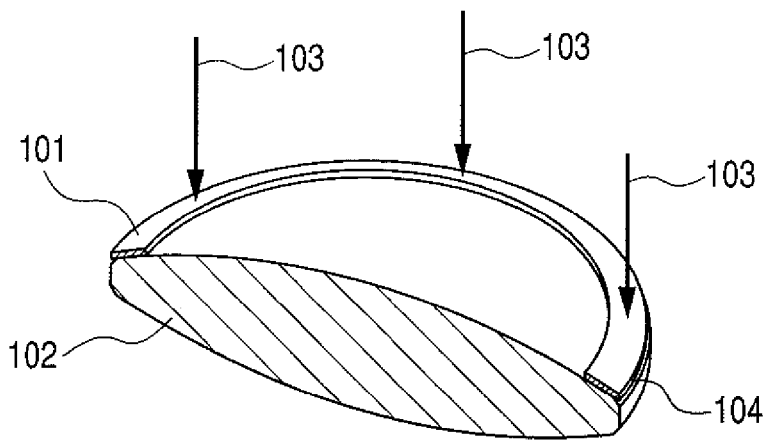
FIGS. 12A and 12B are perspective cross-sectional views of a main portion that respectively show a method of fixing the optical member in a case where the composite members shown in FIG. 10 are used.

As shown in FIG. 12A, laser beams 103 are irradiated from a laser beam irradiation device (not shown) onto the lens 102 and the intermediate member 101 that are positioned. As described above, the intermediate member 101 is made of a member that absorbs the near-infrared ray and whose adhesive strength is increased upon application of heat. Accordingly, the intermediate member 101 is heated upon absorption of the laser beam 103, and the adhesive strength of the intermediate member 101 is increased. Thus, the intermediate member 101 is fixed to the lens 102 by the irradiation of the laser beam 103.

Figure 12B:
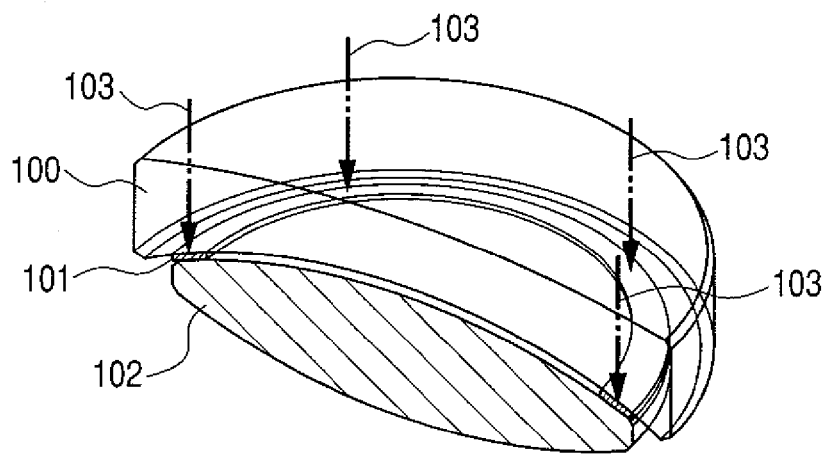

Then, as shown in FIG. 12B, the lens 100 is positioned onto the lens 102 and the intermediate member 101 that are fixed, and the lens 100, the intermediate member 101, and the lens 102 are brought into close contact with each other by the pressurizing device (not shown). At this time, the intermediate member 101 is fixed to the lens 102, so the intermediate member 101 does not move with respect to the lens 102 even while the position of the lens 100 is aligned.

As shown in FIG. 12B, the laser beams 103 are irradiated in a state where the lens 100 is positioned. In this case, the irradiation position of the laser beams 103 is carried out at positions which are on the same diameter and are different from the irradiation position of the laser beams 103 in the case of the irradiation of the laser beams 103 in the above-mentioned state shown in FIG. 12A. The intermediate member 101 is subjected to heat in a portion at which the laser beam is irradiated. However, the heat is applied to a position different from a fixing position of the lens 100 and the intermediate member 101, so the intermediate member 101 does not deviate from its fixed position. After a prescribed irradiation time lapses, the irradiation of the laser beam is ended, and the lens fixing process is completed.

In the method of fixing the optical member of this embodiment, the lens 102, which is a basis and a first lens, and the intermediate member 101 are positioned and fixed before the lens 100, which is a second lens, is positioned and fixed. At this time, the fixing position of the first lens and the intermediate member (in other words, the irradiation position of the laser beam 103) is set to be at a position different from the fixing position of the second lens (in other words, the irradiation position of the laser beam 103), thereby fixing the first lens and the second lens via the intermediate member. Here, the explanation is made as to such a configuration that the lens that is the basis is the first lens. However, it is needless to say that the lens that is the basis may be either the first lens or the second lens.

In addition, in the method of fixing the optical member of this embodiment, the fixing position of the first lens and the intermediate member and the fixing position of the second lens and the intermediate member are positioned at different positions on the same diameter. However, it is needless to say that the fixing positions may be positioned at other positions in order to attain a similar effect.

Figure 13:
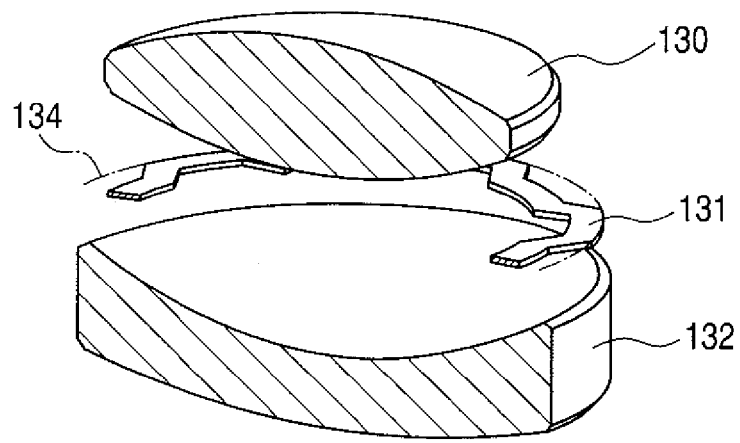
FIG. 13 is a perspective cross-sectional view of a main portion showing structural components in a case where an intermediate member of a different shape is used in the method of fixing the optical member according to the fifth embodiment of the present invention.
Figure 14A:
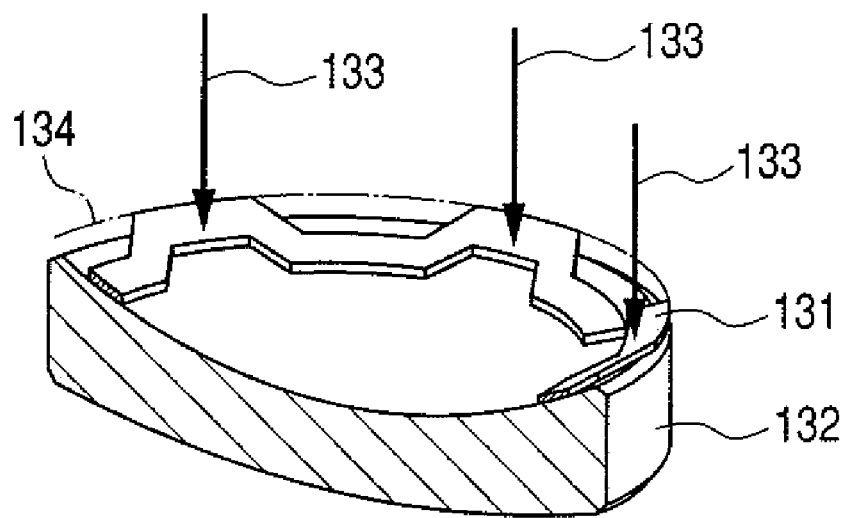
FIGS. 14A and 14B are perspective cross-sectional views of a main portion that respectively show a method of fixing the optical member in a case where the structural components shown in FIG. 13 are used.
Figure 14B:
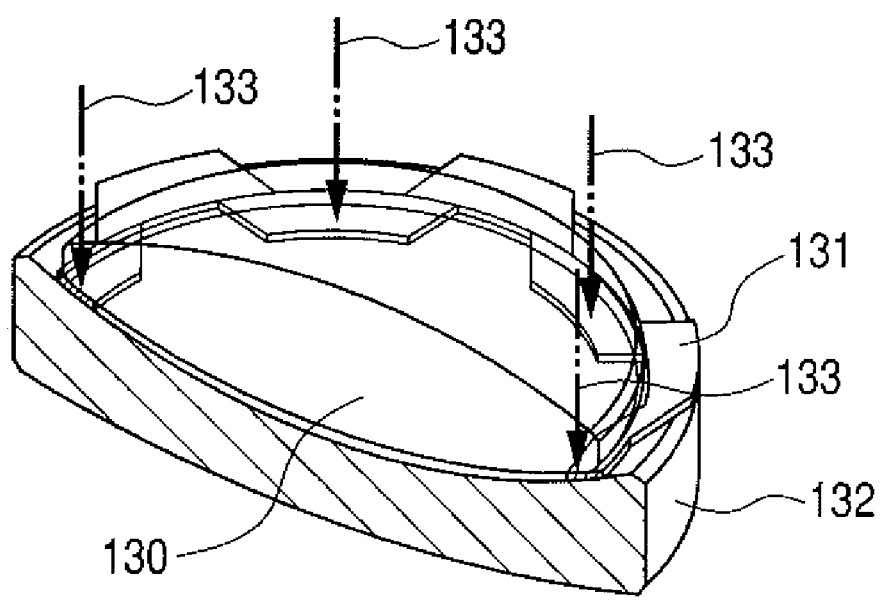

An example of another arrangement of the fixing positions is explained below. FIG. 13 is a perspective view of a main portion cross section showing structural components that is a modification of the fifth embodiment of the present invention. In FIG. 13, reference numerals 130 and 132 each denote a lens, and reference numeral 131 denotes an intermediate member. Reference numeral 133 denotes a laser beam, and reference numeral 134 denotes an outer peripheral end portion of the intermediate member 131. The outer diameter of the intermediate member 131 is set to be of a diameter value substantially the same as the outer diameter of the lens 132. FIGS. 14A and 14B are perspective views of a main portion cross section each showing a state after the fixing. FIG. 14A is a view showing a state where the lens 132 and the intermediate member 131 are fixed. FIG. 14B is a view showing a state where the lens 130, the intermediate member 131, and the lens 132 are fixed.

The lens 130 and the lens 132 are fixed in accordance with steps described below.

As shown in FIG. 13, the intermediate member 131 is configured with a sheet material having a ring shape, and has a cut portion on each of an outer peripheral portion and an inner peripheral portion thereof. The lens 132 and the intermediate member 131 are positioned along portions of the outer peripheral end portion 134 of the intermediate member 131 where no notched portion is formed. When the lens 132 and the intermediate member 131 that are positioned as shown in FIG. 14A are irradiated with the laser beam 133 in the portions that is the outer peripheral portion of the intermediate member 131 where no notched portion is formed, the intermediate member 131 is subjected to heat. As a result, the adhesive strength of the intermediate member 131 is increased. Thus, the lens 132 and the intermediate member 131 are fixed.

Then, as shown in FIG. 14B, the lens 130 is positioned onto the lens 132 and the intermediate member 131 that are fixed, and the lens 130, the intermediate member 131, and the lens 132 are brought into close contact with each other by the pressurizing device (not shown). At this time, the intermediate member 131 is fixed to the lens 132, so the intermediate member 131 does not move with respect to the lens 132 even while the position of the lens 130 is aligned.

The laser beams 133 are irradiated in a state where the lens 130 is positioned. As shown in FIG. 14B, in this case, the irradiation position of the laser beams 133 is carried out at positions which are on the same diameter and different from the irradiation position of the laser beams 133 in the case of the irradiation of the laser beams in the above-mentioned state shown in FIG. 14A and are positions of the inner peripheral portion of the intermediate member 131 where no notched portion is formed. The intermediate member 131 is subjected to heat in a portion at which the laser beam is irradiated. However, the heat is applied to a position different from a fixing position of the lens 130 and the intermediate member 131, so the intermediate member 131 does not deviate from its fixed position. After a prescribed irradiation time lapses, the irradiation of the laser beam is ended, and the lens fixing process is completed.

It is needless to say that whether the above lens is made of a glass material or of a resin material does not contradict the purpose of the present invention.

Further, the lens may be a lens to which the centering process is not carried out.

In addition, in the five embodiments described above, the explanation is made of the fixing of the optical lens related to a photographing optical system. However, the present invention is not limited to the configurations described in the above embodiments. For example, the present invention can be applied not only to the case where two lenses are fixed but also to a case where three or more lenses are fixed. Further, if a configuration of the present invention is different from the configurations of the above-mentioned five embodiments, it is needless to say that any form of embodiment may of course be employed as long as the configuration is in accordance with the contents of the claims of the present invention.

Sixth Embodiment

Figure 15:
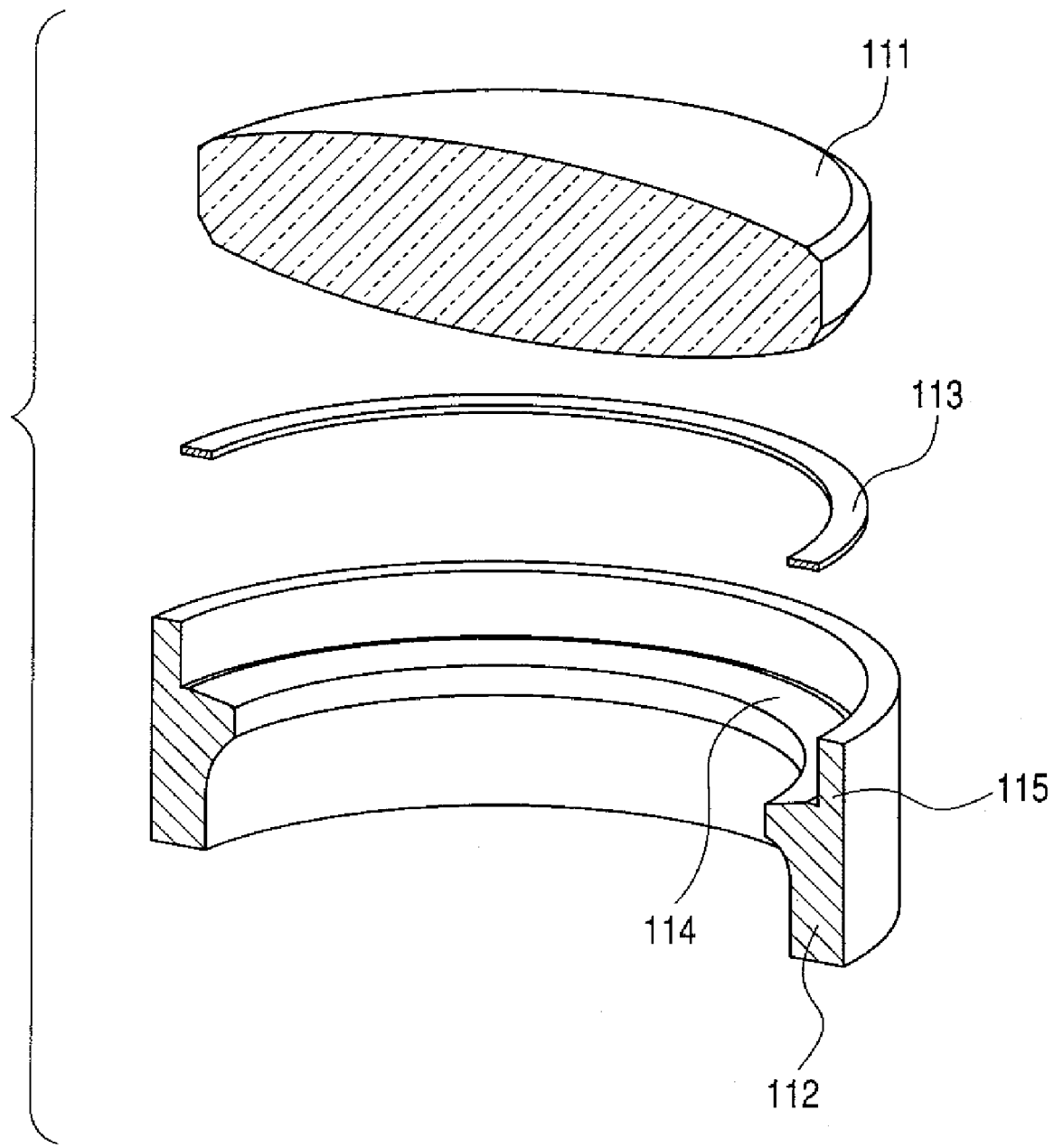
FIG. 15 is an exploded perspective view showing a configuration of a main portion of a lens assembly for which a method of fixing an optical member according to a sixth embodiment of the present invention is used.

FIG. 15 is an exploded perspective view showing a configuration of a main portion of a lens assembly for which a method of fixing an optical member according to a sixth embodiment of the present invention is used.

The lens assembly is, as shown in FIG. 15, provided with a lens 111 that is configured with a concave lens made of a glass material or a resin material, a lens frame 112, and an intermediate member 113 intervening between the lens 111 and the lens frame 112.

The lens frame 112 is configured with a member having a cylindrical shape, and is made of a material that is heated upon absorption of the near-infrared ray. For example, the lens frame 112 is made of a thermoplastic resin material. A base material of the thermoplastic resin material that configures the lens frame 112 is a resin such as: polyamide (PA) such as nylon 6 (PA6) or nylon 66 (PA66); polyethylene (PE); polypropylene (PP); styrene-acrylonitrile copolymer; polyethylene terephthalate (PET); polystyrene; acrylonitrile butadiene styrene (ABS); polymethylmethacrylate (PMMA); polycarbonate (PC); polybutylene terephthalate (PBT); polyphenylene sulfide (PPS), and a prescribed coloring material such as carbon black, dye or pigment as a laser-beam absorbing agent is mixed therein. A striking feature of absorbing the near-infrared ray is obtained by mixing the coloring material. Here, among those thermoplastic resin materials, polycarbonate is particularly suited for the lens frame 112

In addition, a glass fiber-reinforced thermoplastic resin material or a carbon fiber-reinforced thermoplastic resin material may be used for the lens frame 112 as the material thereof. Further, the resin may contain components other than those described above, namely, one or more kinds of a filler composed of an inorganic substance or an organic substance such as glass, silica, talc or calcium carbonate, and an additive of common use such as an antistatic agent, a weathering resistance stabilizer or wax within a scope that does not depart the objects of the present invention.

Further, as the coloring material for coloring the thermoplastic resin used for the lens frame 112, a carbon based material such as graphite used as an adjuvant and an inorganic coloring material such as a multicomponent oxide-based pigment may be used. Further, an organic coloring material may be used if the organic coloring material sufficiently absorbs the laser beam. The examples of such a coloring material include a copper phthalocyanine system pigment.

In addition, it is preferable that the thermoplastic resin have a transmission factor of 5% or less with respect to the laser beam to be irradiated. This is because if the transmission factor exceeds 5%, the energy of the laser beam that is absorbed by the resin material by transmission of the irradiated laser beam is decreased and there occurs loss of energy of the laser beam.

Further, the material of the lens frame 112 is not limited to the material described above. The material of the lens frame 112 may be the material capable of absorbing the laser beam as a heating source without allowing the laser beam to transmit therethrough.

The intermediate member 113 is configured with a thin sheet material (having a thickness of several micrometers to several tens of micrometers, for example) formed into a ring shape. The sheet material has such a characteristic that the adhesive strength thereof is increased upon application of heat.

The lens frame 112 is provided with two positioning portions 114 and 115 on an inner peripheral surface thereof. The positioning portion 114 is a portion for positioning the intermediate member 113 and the lens 111 with respect to an optical axis direction. The positioning portion 114 is configured with a portion protruding from the inner peripheral surface of the lens frame 112, and is formed in a shape along the surface of the light incidence/emission plane of the lens 111. The positioning portions 115 is a portion for positioning the intermediate member 113 with respect to the direction orthogonal to the optical axis so as not to allow the intermediate member 113 to be positioned within an effective diameter of the lens 111. An inner diameter dimension of the positioning portions 115 is substantially equal to the outer diameter dimension of the intermediate member 113.

Figure 16A:
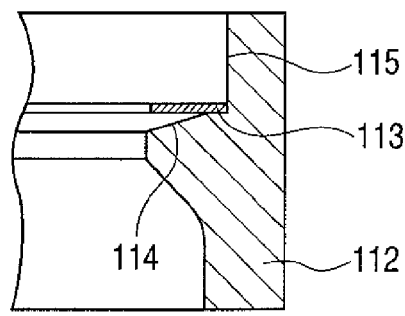
FIG. 16A is a longitudinal sectional view showing a state where an intermediate member 113 is incorporated into a lens frame 112.
Figure 16B:
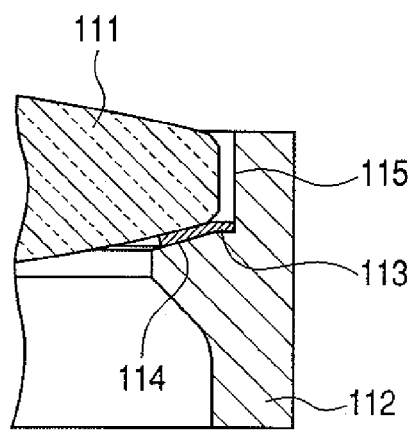
FIG. 16B is a longitudinal sectional view showing a state where a lens 111 is incorporated into the lens frame 112.
Figure 16C:
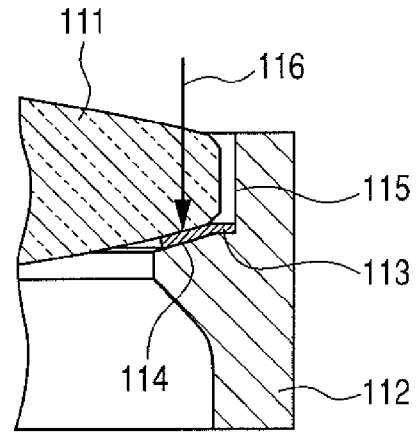
FIG. 16C is a longitudinal sectional view showing an irradiating state of a laser beam at the time of fixing of a lens 111 to the lens frame 112.

Next, the method of fixing the lens 111 and the lens frame 112 is explained with reference to FIGS. 16A, 16B, and 16C. FIG. 16A is a longitudinal sectional view showing a state where the intermediate member 113 is incorporated into the lens frame 112. FIG. 16B is a longitudinal sectional view showing a state where the lens 111 is incorporated into the lens frame 112. FIG. 16C is a longitudinal sectional view showing the irradiating state of the laser beam at the time of fixing the lens 111 to the lens frame 112.

In fixing the intermediate member 111 to the lens frame 112, first, as shown in FIG. 16A, the intermediate member 113 is inserted into the lens frame 112 to be positioned at the positioning portion 114. As a result, the intermediate member 113 is positioned with respect to the optical axis direction. In addition, the intermediate member 113 is also positioned in the direction orthogonal to the optical axis direction so as not to be positioned within the effective diameter of the lens 111, which is to be inserted later.

Then, as shown in FIG. 16B, the lens 111 is inserted into the lens frame 112 in which the intermediate member 113 is arranged, and is positioned at the positioning portion 114 via the intermediate member 113. At this time, the intermediate member 113 is elastically deformed along the shape of the surface of the positioning portion 114 (along the shape of the surface opposing to the surface of the light incidence/emission plane of the lens 111), and is held between the positioning portion 114 of the lens frame 112 and the surface of the light incidence/emission plane of the lens 111.

When the lens 111 is thus incorporated into the lens frame 112 via the intermediate member 113, the lens 111 is pressed by the pressurizing device (not shown) toward the intermediate member 113 in the optical axis direction of the lens 111. As a result, the lens 111, the intermediate member 113, and the lens frame 112 are supported in a state in which they are in close contact with one another.

After that, as shown in FIG. 16C, a laser beam 116 having a wavelength of the near-infrared ray is irradiated from the laser beam irradiation device (not shown) toward the positioning portion 114 in the lens frame 112. In this case, the laser beam 116 transmits through the lens 111 and the intermediate member 113 to reach the positioning portion 114 of the lens frame 112. As described above, the lens frame 112 is configured with the member that absorbs the near-infrared ray, so the positioning portion 114 is heated upon absorption of the laser beam 116. The intermediate member 113 is heated to be fused by the heat generated in the positioning portion 114, and an adhesive strength of the intermediate member 113 is generated due to the characteristic of the intermediate member 113. Then, at this point of time, the irradiation of the laser beam 116 is ended.

When the irradiation of the laser beam 116 is ended, the contacting portion between the intermediate member 113 and the lens 111 and the contacting portion between the intermediate member 113 and the lens frame 112 are instantly cooled off to be coagulated. As a result, they are respectively fixed. In this case, because of the adhesive strength of the intermediate member 113, even when the pressure applied by the above pressurizing device against the lens 111 is released, the lens 111 is not detached from the lens frame 112. Thus, the lens 111 is positioned with respect to the lens frame 112 with high accuracy and without play, and is fixed onto a prescribed portion, namely, onto the positioning portion 114.

In addition, the intermediate member 113 can be elastically deformed, so even when an intense impact is applied to the lens 111 or the lens frame 112, the applied impact is absorbed by the elastic deformation of the intermediate member 113. As a result, due to the characteristic of the intermediate member 113, it is possible to obtain an effect of preventing the lens 111 from being broken or torn into pieces. Further, as described above, the intermediate member 113 is configured with the sheet material having a thickness of several micrometers to several tens of micrometers, so the intermediate member 113 is hardly subjected to the influence of the accuracy. Further, the melting point of the intermediate member 113 is sufficiently lower than the melting point of the lens 111, so the lens 111 is not subjected to heat influences due to the irradiation of the laser beams.

Thus, according to this embodiment, since the surface of the light incidence/emission plane of the lens 111 and the positioning portion 114 of the lens frame 112 are fixed by using the intermediate member 113, it is possible to miniaturize the lens frame 112 without deteriorating the optical performance.

Further, the intermediate member 113 is configured with the sheet material whose adhesive strength is increased upon application of heat, so it is possible to omit a process of, for example, filling in the adhesive after the position of the lens 111 is aligned. As a result, it is possible to fix the lens 111 and the lens frame 112 with a simple configuration and high accuracy.

In this embodiment, the explanation is made as to the example in which the shape of the surface of the positioning portion 114 opposing the lens 111 is formed along the shape of the surface of the light incidence/emission plane of the lens 111. However, the present invention is not limited to this. For example, it is needless to say that the surface of the positioning portion 114 opposing the lens 111 may be shaped in such a form that the opposing surface is in line contact or in point contact with the surface of the light incidence/emission plane of the lens 111.

Figure 17:
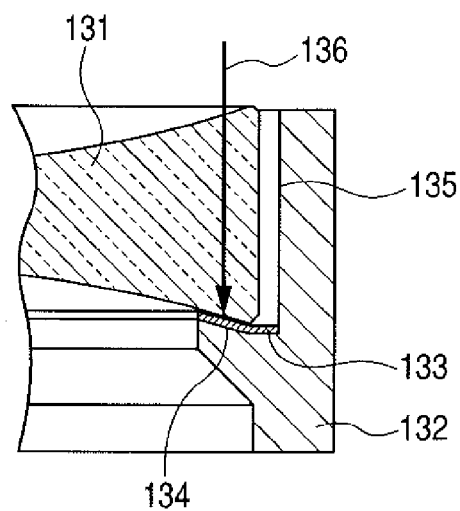
FIG. 17 is a longitudinal sectional view showing a main portion of the lens assembly in which a concave lens is fixed to the lens frame.

Further, in this embodiment, the explanation is made as to the example in which the convex lens and the lens frame are fixed. However, the lens may of course be the lens of another shape such as a concave lens. The example in which the concave lens and the lens frame are fixed is explained with reference to FIG. 17. FIG. 17 is a longitudinal sectional view showing a main portion of the lens assembly in which the concave lens is fixed to the lens frame.

Just as described above in the case of the lens assembly, an intermediate member 133 intervenes between a concave lens 131 and a cylindrical lens frame 132. In addition, the lens frame 132 is provided with two positioning portions 134 and 135 on an inner peripheral surface of the lens frame 132. The positioning portion 134 is a positioning portion for positioning the lens 131 and the intermediate member 133 with respect to the optical axis direction, in a similar way in the case of the positioning portion 114. The positioning portion 134 is shaped so that the surface of the positioning portion 134 opposing the concave lens 131 is shaped along the shape of the surface of the light incidence/emission plane of the concave lens 131. The positioning portion 135 is, in a similar way of the positioning portion 115, is a portion for positioning the intermediate member 133 in a direction orthogonal to the optical axis so as not to allow the intermediate member 133 to be positioned within an effective diameter of the concave lens 131.

The concave lens 131 is fixed by, in a similar way in the case of the convex lens, irradiating the laser beam 136 having a wavelength of the near-infrared ray from the laser beam irradiation device (not shown) toward the positioning portion 134 in the lens frame 132, as shown in FIG. 17. The intermediate member 133 is heated by the heat generated at the positioning portion 134 of the lens frame 132 by the irradiation of the laser beam 136. Thus the adhesive strength is generated with the intermediate member 133, thereby adhering and fixing the concave lens 131 to the lens frame 132. Thus, the method of fixing the concave lens 131 is the same as the method of fixing the convex lens, so a detailed explanation thereof is omitted.

Figure 18A:
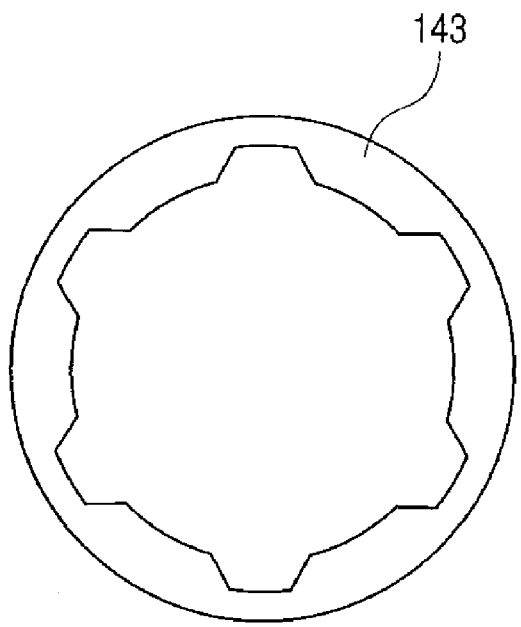
FIG. 18A is a plan view showing another example of the intermediate member.
Figure 18B:
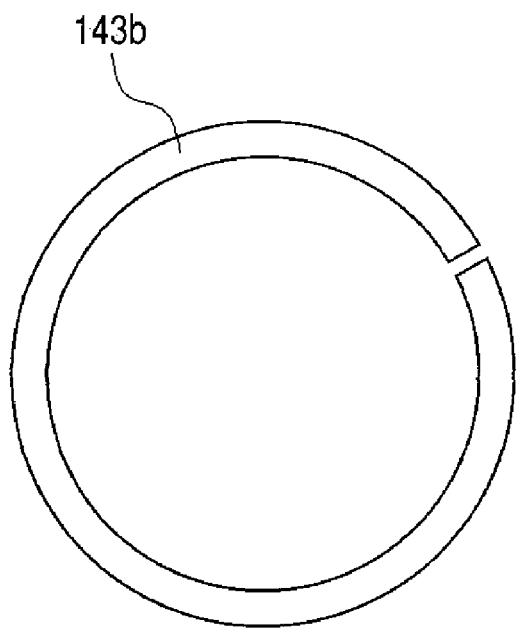
FIG. 18B is a plan view showing a further example of the intermediate member.
Figure 18C:
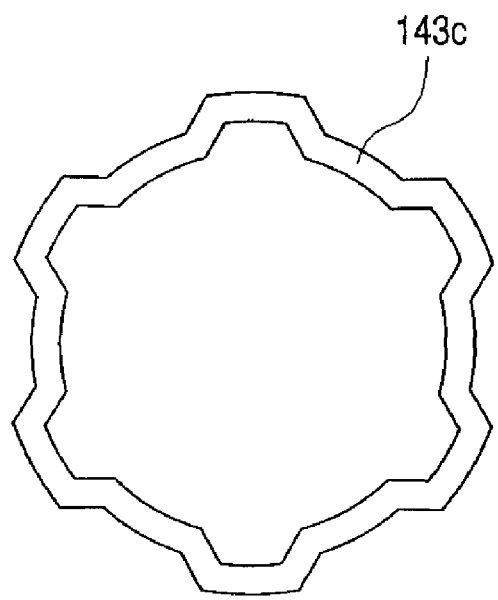
FIG. 18C is a plan view showing another example of the intermediate member.

In addition, in this embodiment, the intermediate members 113 and 133 having the ring-like shape are used. However, an intermediate member of another form can be used. The intermediate member having the other form is explained with reference to FIGS. 18A, 18B, and 18C. FIG. 18A is a plan view showing the other example of the intermediate member. FIG. 18B is a plan view showing another example of the intermediate member. FIG. 18C is a plan view showing a still another example of the intermediate member.

For the intermediate member, an intermediate member 143 having a shape as shown in FIG. 18A can be used. The intermediate member 143 is, in a similar way of the intermediate members 113 and 133, basically configured with the sheet material formed in a ring-like shape. The intermediate member 143 is provided with a plurality of notched portions in an inner peripheral portion thereof. Because the plurality of notched portions are provided thereto, the intermediate member 143 is brought into close contact with the surface of the light incidence/emission plane of the concave lens or the convex lens without any wrinkle, and thereby the closeness of the contact between the intermediate member 143 and the concave or convex lens is improved.

Besides, in order to obtain the close contact as in the case of the intermediate member 143, intermediate members 143*b* and 143*c* having shapes as shown in FIG. 18B and FIG. 18C, respectively, can be used. Here, the intermediate member 143*b* is configured with the sheet material formed substantially into a C-shape. Besides, the intermediate member 143*b* is provided with one notched portion extended from an outer peripheral portion thereof to an inner peripheral portion thereof. Further, the intermediate member 143*c* is configured with the sheet material formed in a ring-like shape, and is provided with a plurality of notched portions on each of an inner peripheral portion thereof and an outer peripheral portion thereof.

The shape of the intermediate member is not limited to the shapes as described above as examples, and another configuration may be employed. Besides, the intermediate member may be arranged so that the surface thereof opposing the lens is wholly brought into contact with the surface of the lens, or otherwise, the intermediate member may be arranged so that the surface thereof opposing the lens is partially brought into contact with the surface of the lens.

In this embodiment, a pattern of irradiation of the laser beam is not especially limited. However, for the irradiation pattern of the laser beam, a pattern in which spot light beams are irradiated at a plurality of positions or a pattern in which a ring-shaped laser beam is irradiated over the whole periphery of the intermediate members 113 and 133 can be used. Further, in a case where the spot lights are irradiated at the plurality of positions at the same time, the irradiation of each spot light is not necessarily be carried out at the same time exactly. That is, the laser beams may be irradiated with a time difference that does not affect a positional accuracy of the lens 111. In this case, each spot light may be irradiated by the time difference of, for example, several tens of milliseconds to several hundreds milliseconds.

In this embodiment, as a mechanism for heating the intermediate members 113 and 133, the mechanism that allows the lens frames 112 and 132 by the irradiation of the laser beam and the intermediate members 113 and 133 are heated by the heat generated by the irradiation of the laser beam. Alternatively, it is also possible to use a mechanism in which the intermediate member is configured with using the material made by color coating onto an adhesive sheet material such as a thermo-fusing sheet and a thermal adhesive sheet (a thermosetting type) in order to absorbing the laser beam, or by using a material made by mixing a prescribed coloring material such as carbon black, dye, and pigment is mixed into the adhesive sheet material as a laser-beam absorbing agent to heat the intermediate member by the irradiation of the laser beam onto the intermediate member can be employed. In this case, the lens frame may not necessarily be configured with the laser beam-absorbing member. Further, by using such an intermediate member, the adhesion position can be more freely selected, and it is possible to reduce the time for adhesion.

Seventh Embodiment

Figure 19:
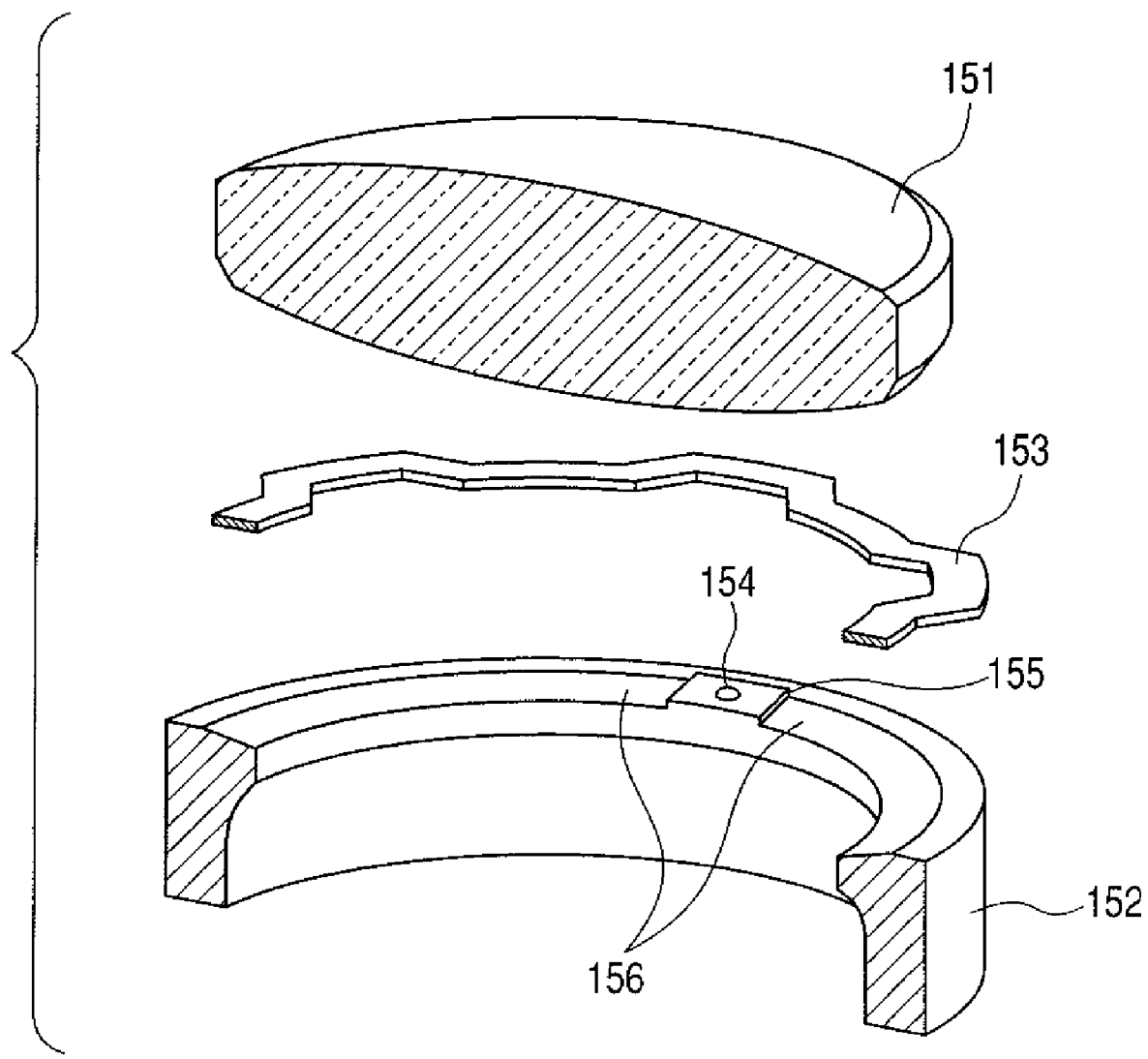
FIG. 19 is an exploded perspective view showing a configuration of a main portion of a lens assembly for which a method of fixing an optical member according to a seventh embodiment of the present invention is used.
Figure 22:
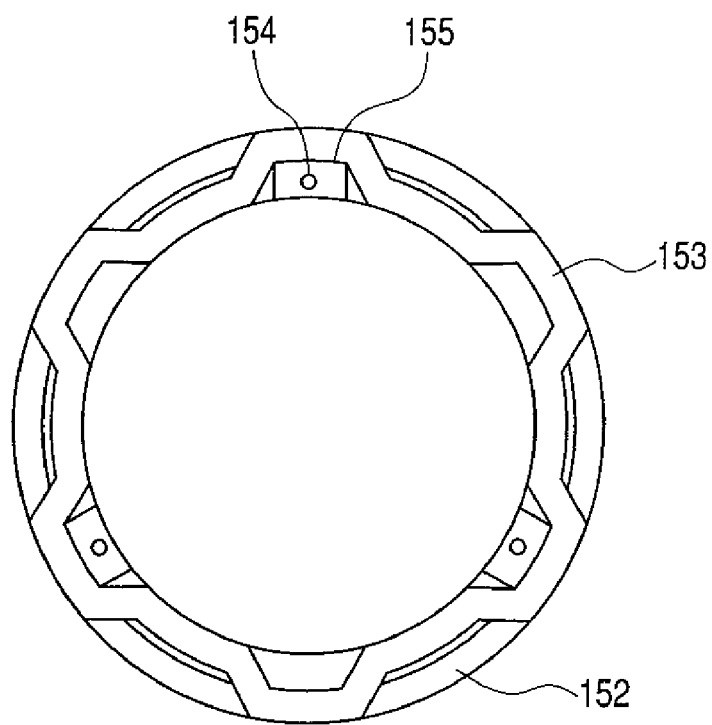
FIG. 22 is a plan view showing a state where the intermediate member is incorporated into the lens frame shown in FIG. 19.

Next, a seventh embodiment of the present invention is explained with reference to FIGS. 19 through 22. FIG. 19 is an exploded perspective view showing a configuration of a main portion of a lens assembly for which a method of fixing an optical member according to a seventh embodiment of the present invention is used. FIG. 20 is a longitudinal sectional view showing a state where the lens shown in FIG. 19 is fixed to the lens frame via an intermediate member. FIG. 21A is a longitudinal sectional view showing a state where the intermediate member is incorporated into the lens frame shown in FIG. 19. FIG. 21B is a longitudinal sectional view showing a state where the intermediate member and the lens are incorporated into the lens frame shown in FIG. 19. FIG. 22 is a plan view showing a state where the intermediate member is incorporated into the lens frame shown in FIG. 19.

The lens assembly is, as shown in FIGS. 19 and 20, provided with a lens 151 configured with a convex lens, a lens frame 152, and an intermediate member 153 intervening between the lens 151 and the lens frame 152. The lens frame 152 is configured with a cylindrical member, and the material thereof is the same as in the configuration of the sixth embodiment described above. The intermediate member 153 is configured with a thin sheet material formed in a ring shape (having a thickness of several micrometers to several tens of micrometers, for example), and the material thereof is the same as in the configuration in the sixth embodiment of the present invention. In addition, the intermediate member 153 is processed in the same shape as the shape of the intermediate member 143*c* shown in FIG. 18C. Besides, the intermediate member 153 is provided with six notched portions for each of an inner peripheral portion and outer peripheral portion thereof.

At one end portion of the lens frame 152, there are provided a plurality of first positioning portions 154 for positioning the lens 151 in the optical axis direction, a plurality of second positioning portions 155 for positioning the intermediate member 153 in a direction orthogonal to the optical axis direction of the intermediate member 153, and a fixing portion 156 at which the laser beam is irradiated in order to fix the lens frame 152 and the lens 151.

Here, the fixing portion 156 is configured with a portion extended along an inner peripheral portion of one end portion of the lens frame 152, and is shaped in a form along a surface of a light incidence/emission plane of the lens 151.

The second positioning portions 155 are configured with a portion protruding upward from the fixing portion 156. The second positioning portions 155 are shaped in a rectangle planar shape as shown in FIG. 22. In addition, the second positioning portions 155 are disposed at equal intervals along a circumferential direction in the fixing portion 156. In this embodiment, three second positioning portions 155 are formed in correspondence with three notched portions among the six notched portions on the inner peripheral portion of the intermediate member 153.

Each of the first positioning portions 154 is configured with a convex portion formed onto an upper surface of the second positioning portion 155 corresponding thereto, and is disposed at an equal interval as shown in FIG. 22. In this embodiment, three first positioning portions 154 are formed.

In this embodiment, there is no wall surface surrounding an outer diameter (edge) of the lens 151 in the outer peripheral portion of the lens frame 152, and the outer diameter of the lens frame 152 and the outer diameter of the lens 151 are set to be at a value significantly close to each other.

In fixing the lens 151 to the lens frame 152, first, as shown in FIG. 21A, the intermediate member 153 is positioned at the positioning portion 156, and the intermediate member 153 is positioned by the second positioning portions 155 in a direction orthogonal to the optical axis with respect to the lens frame 152. The positioning is carried out by inserting and fitting the notched portions formed in the inner peripheral portion of the intermediate member 153 into the second positioning portions 155 as shown in FIG. 22.

Then, as shown in FIG. 21B, the lens 151 is positioned to be brought into contact with the first positioning portions 154 of the lens frame 152 to which the intermediate member 153 is positioned. Here, the thickness of the intermediate member 153 is set so that the lens 151 is positioned slightly lower than the first positioning portions 154 when the lens 151 is incorporated into the lens frame 152. With this setting, in the state where the lens 151 is in contact with the first positioning portions 154 of the lens frame 152, a slight clearance is formed between the intermediate member 153 and the lens 151. In addition, in this state, the intermediate member 153 is elastically deformed along the shape of a surface of the light incidence/emission plane of the lens 151, and is brought into close contact with the lens 151.

In this way, in the state where the lens 151 and the intermediate member 153 are incorporated into the lens frame 152, the laser beam having a near-infrared component is irradiated from a laser irradiation device (not shown). That is, the laser beam is transmitted through the lens 151 and is irradiated onto the fixing portion 156 via (with being transmitted through) the intermediate member 153, and thus the lens frame 152 is heated upon absorption of the laser beam. In this state, the intermediate member 153 is heated by the heat of the lens frame 152. Then, the intermediate member 153 is thermally expanded to fill in the clearance between the intermediate member 153 and the lens 151. Then the intermediate member 153 is brought into close contact with each of the fixing portion 156 and the surface of the light incidence/emission plane of the lens 151, and thus the lens 151 and the intermediate member 153, and the lens frame 152 and the intermediate member 153, respectively, are fixed by adhesion. At this stage, the irradiation of the laser beam is ended.

When the irradiation of the laser beam is ended, the contacting portion of the intermediate member 153 and the lens 151 and the contacting portion of the intermediate member 153 and the lens frame 152 are fixed. Further, the intermediate member 153 is instantly cooled off and is contracted. In this regard, because the contacting portion between the intermediate member 153 and the lens 151 and the contacting portion between the intermediate member 153 and the lens frame 152 are closely contacted, the intermediate member 153 cannot be contracted by a volume equivalent to the clearance. Accordingly, even after the irradiation of the laser beam, a force that presses the contacting portion between the lens 151 and the lens frame 152 under pressure remains, whereby it is possible to fix the lens 151 with high accuracy to be supported by the lens frame 152.

In addition, there is no wall surface surrounding the outer diameter (edge) of the lens 151 in the outer peripheral portion of the lens frame 152, and thereby it is possible to fix the lens 151 to the lens frame even when the lens 151 is not centered, without requiring a high quality of the components.

In this embodiment, the explanation is made as to a case where the laser beam is irradiated when the lens 151 and the intermediate member 153 are merely incorporated into the lens frame 152. However, the irradiation of the laser beam may be carried out, for example, in a state where the lens 151 is supported with a vacuum suction tool and the like, the position of the lens frame 152 is aligned, and this state is maintained.

Eighth Embodiment

Figure 23:
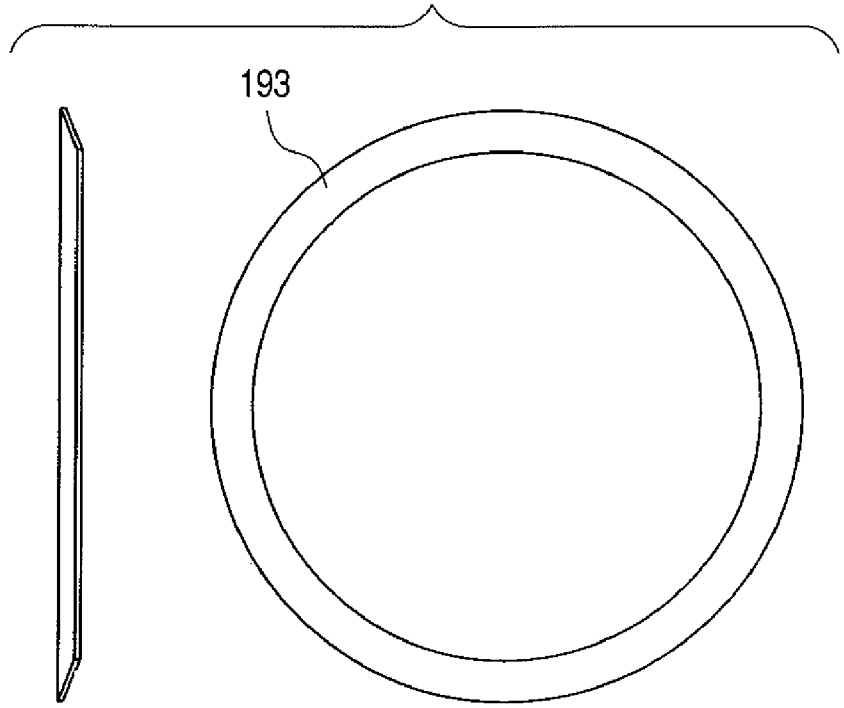
FIG. 23 is a plan view and a side view of an intermediate member as used for a method of fixing an optical member according to an eighth embodiment of the present invention.
Figure 24A:
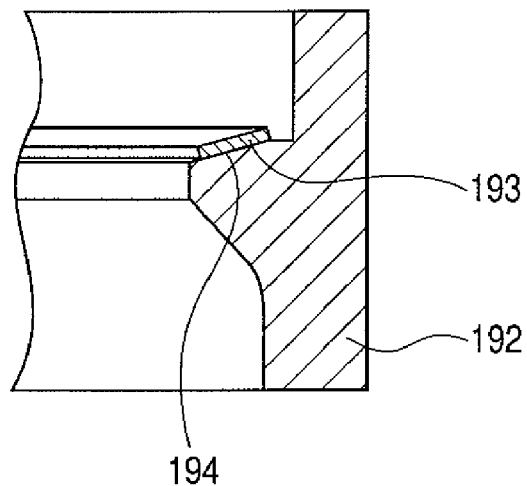
FIG. 24A is a longitudinal sectional view showing a state where the intermediate member is incorporated into the lens frame.
Figure 24B:
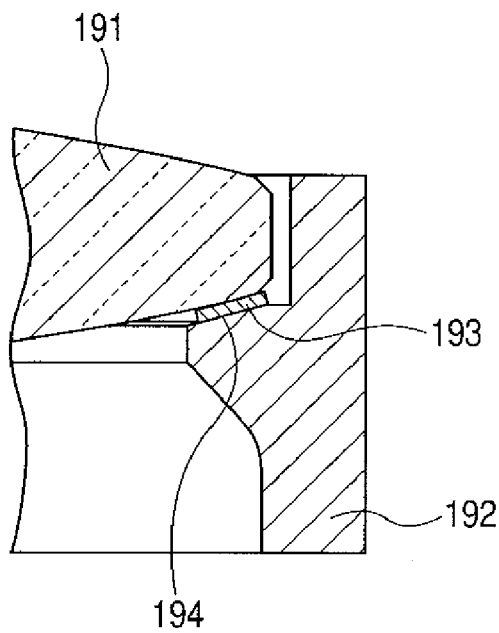
FIG. 24B is a longitudinal sectional view showing a state where a lens is incorporated into the lens frame.
Figure 24C:
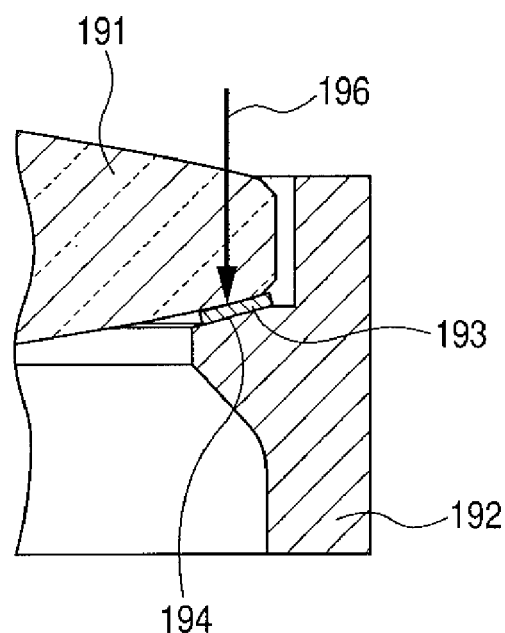
FIG. 24C is a longitudinal sectional view showing an irradiating state of a laser beam at the time of fixing the lens to the lens frame.

Next, an eighth embodiment of the present invention is explained with reference to FIGS. 23, 24A, 24B, and 24C. FIG. 23 is a plan view and a side view of an intermediate member as used for a method of fixing an optical member according to an eighth embodiment of the present invention. FIG. 24A is a longitudinal sectional view showing a state where the intermediate member is incorporated into the lens frame. FIG. 24B is a longitudinal sectional view showing a state where a lens is incorporated into the lens frame. FIG. 24C is a longitudinal sectional view showing an irradiating state of a laser beam at the time of fixing the lens to the lens frame.

A lens assembly according to this embodiment is, as shown in FIGS. 24A, 24B, and 24C, provided with a lens 191 configured with a convex lens, a lens frame 192, and an intermediate member 193 intervening between the lens 191 and the lens frame 192. The lens frame 192 is configured with a cylindrical member, and is provided with a positioning portion 194 for positioning the lens 191 and the intermediate member 193 in an inner peripheral surface of the lens frame 192. The positioning portion 194 is configured with a portion protruded from the inner peripheral surface of the lens frame 192, and a surface of the protruding portion opposing the lens 191 is formed in a shape along the shape of an R surface of the lens 191. The intermediate member 193 is positioned by the positioning portion 194 with respect to the lens frame 192 so that the intermediate member 193 does not thrust into an effective diameter of the lens 191. In addition, the lens 191 and the intermediate member are positioned in the optical axis direction of the lens frame 192.

In this embodiment, as shown in FIG. 23, the intermediate member 193 having a dish-like shape whose center portion is opened is used. The outer peripheral portion of the intermediate member 193 is shaped along the shape of the R surface of the lens 191. Further, the intermediate member 193 is formed in the shape along the R surface of the lens 191 after stamping a planar sheet material into a circular shape. Accordingly, the intermediate member 193 is brought into close contact with each of the R surface of the lens 191 and the positioning portion 194 between the R surface of the lens 191 having irregularities and the positioning portion 194 of the lens frame 192 without any wrinkle, as shown in FIG. 24B.

When fixing the lens 191 to the lens frame 192, first, as shown in FIG. 24A, the intermediate member 193 is inserted into the lens frame 192, and the intermediate member 193 is positioned within the lens frame 192 by the positioning portion 194. Then, as shown in FIG. 24B, the lens 191 is inserted into the lens frame 192 into which the intermediate member 193 is arranged, and the lens 191 is positioned within the lens frame 192 by the positioning portion 194. In this case, the intermediate member 193 is elastically deformed to be held between the positioning portion 194 of the lens frame 192 and the R surface of the lens 191.

When the lens 191 is incorporated into the lens frame 192 via the intermediate member 193 in this way, the lens 191 is pressed in the optical axis direction of the lens 191 toward the intermediate member 193 by the pressurizing device (not shown). Then, as shown in FIG. 24C, a laser beam 196 having a wavelength of a near-infrared ray is irradiated from the laser irradiation device (not shown) toward the positioning portion 194 in the lens frame 192. By the irradiation of the laser beam 196, the contacting portion between the intermediate member 193 and the lens 191 and the contacting portion between the intermediate member 193 and the lens frame 192 are fixed. Accordingly, the lens 191 is positioned and fixed to the lens frame 192 with high accuracy, without play.

In this embodiment, for the method of forming the dish-like intermediate member 193 whose center portion is opened, the method in which the sheet material is stamped into the circular shape and then the circular portion is formed in the shape along the R surface of the lens 191 is described. However, the present invention is not limited to this. Other methods may be adopted for forming the dish-like intermediate member whose center portion is opened.

Ninth Embodiment

Figure 25:
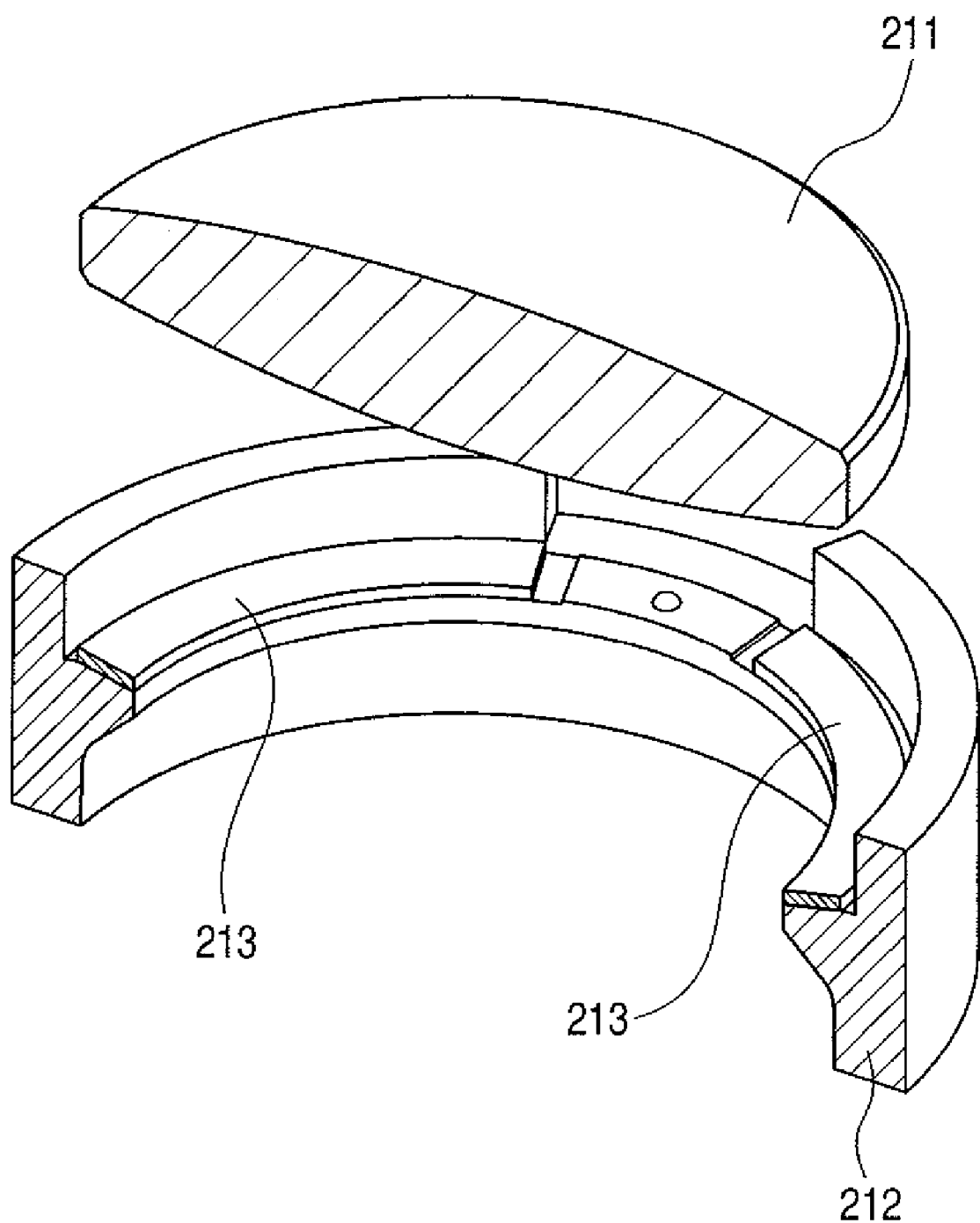
FIG. 25 is a perspective view of a lens and a lens supporting frame fixed to each other by a method of fixing an optical member according to a ninth embodiment of the present invention.
Figure 26A:
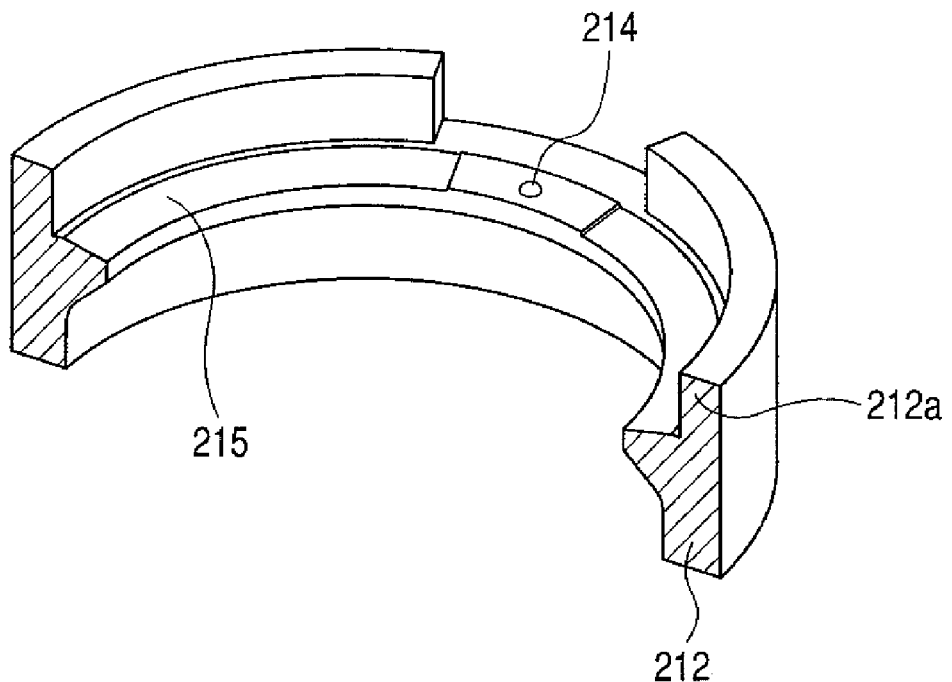
FIG. 26A is a perspective view of a main portion of the lens supporting frame.
Figure 26B:
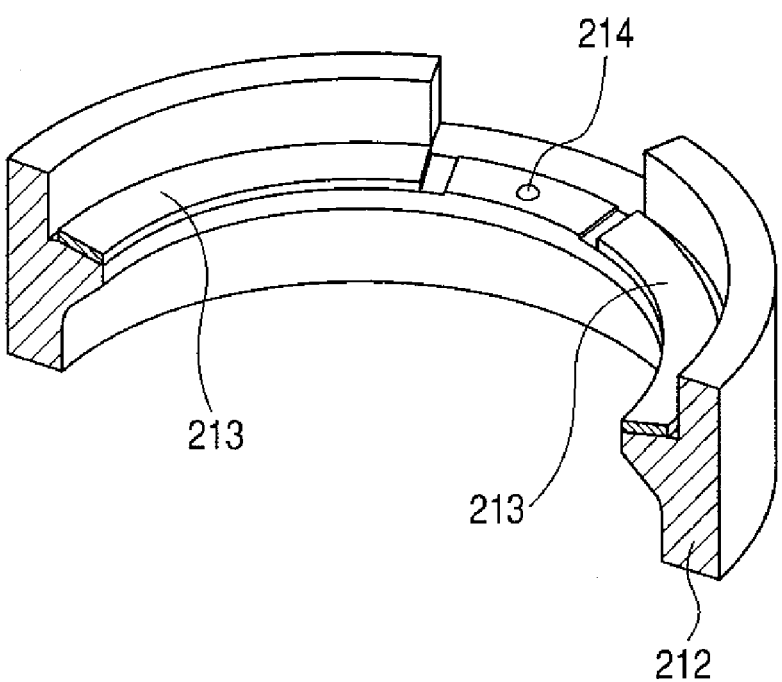
FIG. 26B is a perspective view of a fixing portion of the lens supporting frame with an intermediate material applied thereto.

FIG. 25 is a perspective view of a lens and a lens supporting frame fixed to each other by a method of fixing an optical member according to the ninth embodiment of the present invention. FIG. 26A is a perspective view of a main portion of the lens supporting frame, and FIG. 26B is a perspective view of the fixing portion of the lens supporting frame with an intermediate material applied thereto.

As shown in FIG. 25, in this embodiment, a lens (optical member) 211 is fixed to a lens supporting frame 212 by means of an intermediate material 213. The lens 211 is constituted by a convex lens made of a glass material or a resin material.

As shown in FIG. 26A, the lens supporting frame 212 is formed of a cylindrical member. One end portion 212a of the lens supporting frame 212 has an inner diameter that is slightly larger than the outer diameter of the lens 211 so that it can receive the lens 211. The one end portion 212a constitutes a positioning portion for effecting positioning on the lens 211 in a direction perpendicular to the optical axis direction with respect to the lens supporting frame 212. On the inner peripheral surface of the lens supporting frame 212, there are provided a fixing portion 215 and a plurality of positioning portions 214. The fixing portion 215 is constituted by a step portion protruding from the inner peripheral surface of the lens supporting frame 212; the step portion constitutes the portion for fixing the lens 211. As shown in FIG. 26B, the intermediate material 213 is uniformly applied to the fixing portion 215 by using a printing technique, such as padding or a dispenser. Here, the intermediate material 213 is applied to the regions of the fixing portion 215 exclusive of the positioning portions 214. The intermediate material 213 is liquid at the time of application to the lens supporting frame 212, and solidifies after the application.

The positioning portions 214 are portions for effecting positioning on the lens 211 in the optical axis direction thereof with respect to the lens supporting frame 212; they are formed on the fixing portion 215 at predetermined intervals in the circumferential direction of the lens supporting frame 212. While FIG. 26A shows only one positioning portion 214, three or more positioning portions 214 are actually provided. The height of the positioning portions 214 (height thereof with respect to the fixing portion 215) is set such that they protrude upwards by approximately several μm to several tens of μm from the intermediate material 213 applied to the fixing portion 215. Further, the positioning portions 214 are configured such that they come into point contact with the lens 211 when the lens 211 is incorporated into the lens supporting frame 212. Thus, the precision with which positioning is effected on the lens 211 with respect to the lens supporting frame 212 by the positioning portions 214 is not impaired by the intermediate material 213, thereby making it possible to effect positioning on the lens 211 in the optical axis direction with respect to the lens supporting frame 212 with high accuracy.

The intermediate material 213 has a characteristic in which adhesive force thereof enhances when heat is imparted thereto. To be more specific, the intermediate material 213 is constituted by a thermoplastic polymer, a thermosetting polymer, etc. dissolved in a solvent. It is possible to use a commercially available product as the combination of a thermoplastic polymer, which constitutes the intermediate material 213, and a solvent. Examples of such the commercially available product include a combination of polyamide imide and a [1:1] mixed solvent of toluene and ethyl alcohol, a combination of thermoplastic polyimide and N-methyl-2-pyrolidone, and a combination of polyamide and a [1:2] mixed solvent of toluene and IPA.

Further, monovalent aliphatic alcohols are used for alcohols of the above-mentioned solvents for mixing polyamide-imide. Examples of the monovalent aliphatic alcohols include methyl alcohol, ethyl alcohol, n-propyl alcohol, isopropyl alcohol, butyl alcohol, pentyl alcohol, hexyl alcohol, heptyl alcohol, and octyl alcohol. In addition, ethylene glycol, propylene glycol, trimethylol propane, and the like can be used.

Further, for the solvent to be mixed in the alcohol solvent, a ketone solvent, an ester solvent, a carbon hydride solvent, an ether solvent, and the like can be used. Examples of the ketone solvent include acetone, methyl ethyl ketone, methyl isobutyl ketone, and cyclohexanone. Examples of the ester solvent include methyl acetate, ethyl acetate, and Cellosolve acetate. Examples of the carbon hydride solvent include benzene, toluene, xylene, and Solvesso. Examples of the ether solvent include tetrahydrofuran, 1,4-dioxane, and Diglyme.

Instead of the above-mentioned combinations of a thermoplastic polymer and a solvent, it is also possible to use some other combination as the intermediate material 213. For example, it is possible to use a combination of polyether sulfone and N-methyl-2-pyrolidone, acetone, methyl acetate, or a hydrocarbon chloride type solvent. It is also possible to use a combination of polyethyl methacrylate and MEK, MIBK, or xylene.

Further, as the intermediate material 213, it is also possible to use a material obtained by mixing a thermoplastic polymer with a solvent. Here, examples of the thermoplastic polymer include epoxy resin, acrylic resin, silicone resin, and a mixture of a copolymer and a photo/thermal initiator. Examples of the solvent that can be used include toluene, xylene, MEK, and MIBK.

In this embodiment, the intermediate material 213 is a material obtained by mixing polyamide imide with a [1:1] mixture solution of toluene and ethyl alcohol. The amount of polyamide imide in the intermediate material 213 is, for example, approximately 25% by weight.

Further, in this embodiment, to impart laser absorbing characteristic to the intermediate material 213 a predetermined coloring agent, such as carbon black, dye, or pigment, is mixed in the intermediate material 213. With this arrangement, when a laser beam is applied to the intermediate material 213, the intermediate material absorbs the laser beam, and generates heat. In this case, there is no need for the lens supporting frame 212 to be formed of a laser absorbing material. Further, by using such the intermediate material 213, the degree of freedom in terms of the selection of the adhering portions increases, and it is possible to shorten the adhesion time. Further, it is also possible for the intermediate material 213 to function as an optical stop for shielding a reflected harmful light beam from a peripheral portion or the like other than image taking light beams. Further, the intermediate material 213 itself functions as a heat source when increasing the adhesive force of the intermediate material 213, so the lens supporting frame 212 does not undergo any thermal deformation. As a result, it is possible to fix the lens 211 and the lens supporting frame 212 to each other instantaneously with high positional accuracy.

Figure 27:
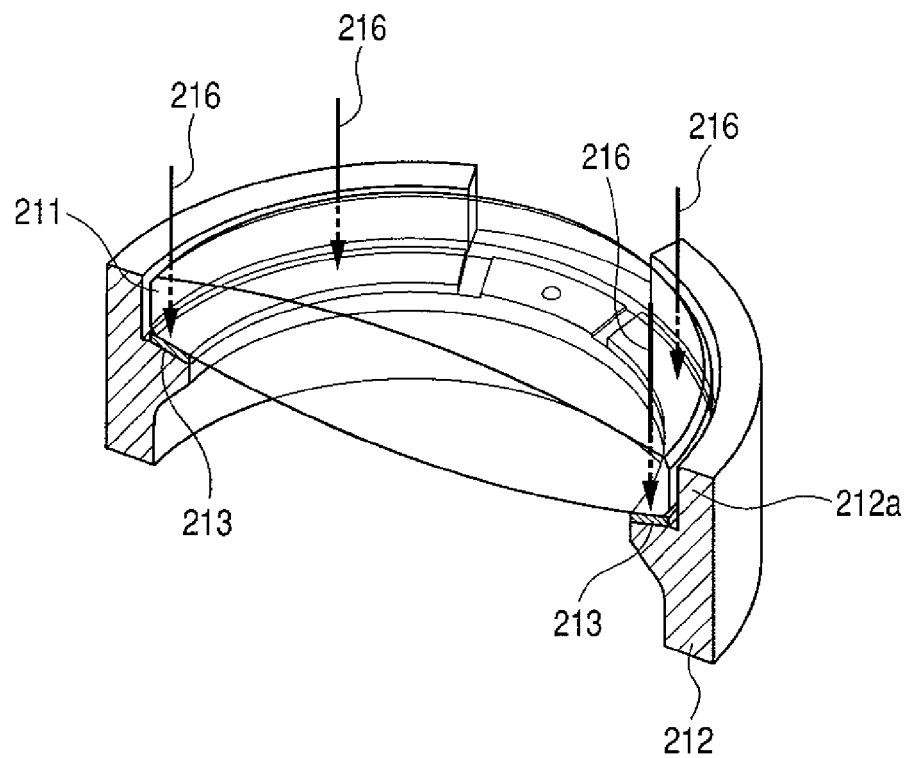
FIG. 27 is a perspective view of the lens as inserted into the lens supporting frame.

Next, a method of fixing the lens 211 and the lens supporting frame 212 to each other will be described with reference to FIG. 27. FIG. 27 is a perspective view of the lens as incorporated in the lens supporting frame.

When fixing the lens 211 and the lens supporting frame 212 to each other, the intermediate material 213 is previously applied to the lens supporting frame 212 used. First, as shown in FIG. 27, the lens 211 is incorporated into one end portion 212a of the lens supporting frame 212 to which the intermediate material 213 has been applied. Then, positioning of the lens 211 with respect to the lens supporting frame 212 is effected by a positioning adjustment tool (not shown). At this time, the lens 211 is being pressed in the optical axis direction against the lens supporting frame 212 by a pressing device (not shown).

Next, a plurality of laser beams 216 having a near-infrared wavelength are applied from a laser irradiation device (not shown) to the lens 211. Each laser beam 216 is transmitted through the lens 211 to reach the intermediate material 213. As stated above, the intermediate material 213 absorbs near-infrared light, so it absorbs the laser beams 216, and generates heat. As a result of the heat generation of the intermediate material 213 itself, the intermediate material 213 comes into intimate contact with the lens 211 and the lens supporting frame 212 while undergoing fusion and thermal expansion. At this stage, the laser irradiation is completed.

When the laser irradiation is completed, the portion of the intermediate material 213 which is in contact with the lens 211 and the portion thereof (fixing portion 215) which is in contact with the lens supporting frame 212 are instantaneously cooled to solidify and shrink. As a result, the intermediate material 213 functions as adhesive and the portion of the lens 211 which is opposed to the fixing portion 215 is firmly attached to the fixing portion 215 of the lens supporting frame 212. Then, the pressurization of the lens 211 and the lens supporting frame 212 by the pressing device is canceled. Even after the canceling of the pressurization, the lens 211 and the lens supporting frame 212 are always kept firmly attached to each other by the adhesive force of the intermediate material 213.

In this way, the lens 211 undergoes positioning and is firmly attached to the lens supporting frame 212 with high accuracy without involving any play therebetween. When, in the state in which the lens 211 is firmly attached to the lens supporting frame 212, a strong impact force is applied to the lens 211 or the lens supporting frame 212, the intermediate material 213 undergoes elastic deformation, and absorbs the impact force. As a result, the lens 211 is protected against the impact force from the outside, thereby making it possible to prevent the lens from being broken by this impact force.

While, in this embodiment, the positioning of the lens 211 in the optical axis direction with respect to the lens supporting frame 212 is effected through point contact between the lens 211 and the positioning portions 214, this should not be construed restrictively. For example, it is also possible for the positioning portions 214 to be configured so as to come into line contact or face contact with the lens 211.

Since the intermediate material 213 is liquid at the time of application, it can be applied to the fixing portion 215 of the lens 211 in various patterns. Further, the intermediate material 213 can also be applied to a small area portion, a complicated portion, etc.

Figure 28:
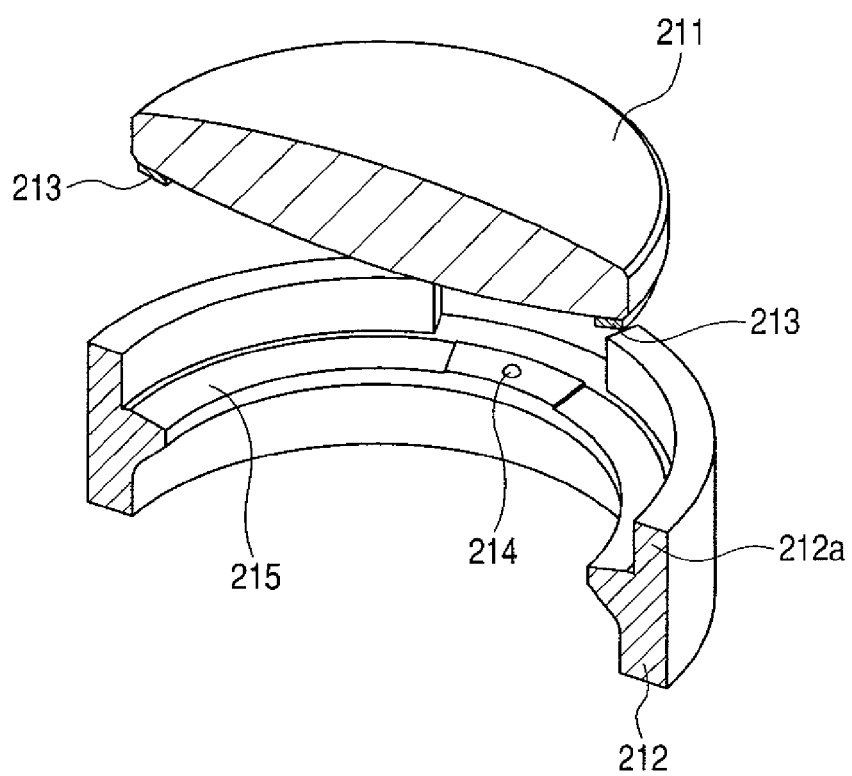
FIG. 28 is a perspective view of a lens 211 with an intermediate material 213 applied thereto and a lens supporting frame 212.

While, in this embodiment, the intermediate material 213 is applied to the lens supporting frame 212, the intermediate material 213 may alternatively be applied to the lens 211 or to both the lens 211 and the lens supporting frame 212. Here, a case in which the intermediate material 213 is applied to the lens 211 will be described with reference to FIG. 28. FIG. 28 is a perspective view of the lens 211 with the intermediate material 213 applied thereto and the lens supporting frame 212.

As shown in FIG. 28, when applied to the lens 211, the intermediate material 213 is applied to the portion of the lens 211 opposed to the fixing portion 215. While liquid at the time of application, the intermediate material 213 solidifies after the elapse of a predetermined period of time. After the solidification of the applied intermediate material 213, the lens 211 is to be incorporated into one end portion 212a of the lens supporting frame 212. Thus, when the lens 211 is incorporated, the intermediate material 213 doesn't flow by the gravitational force. Further, even if the lens 211 (or lens supporting frame 212) is moved in a state in which the lens 211 has been incorporated into the lens supporting frame 212 (prior to fixation), the intermediate material 213 doesn't flow on the surface of the lens 211. Further, there is no need to perform the operation of fixing the lens 211 and the lens supporting frame 212 to each other with the lens 211 and the lens supporting frame 212 being held with the optical axis direction and the gravitational force direction being matched with each other; the operation of fixing the lens 211 and the lens supporting frame 212 to each other can be conducted in various posture.

While, in this embodiment, the intermediate material 213 is caused to undergo heat generation through laser beam irradiation to thereby increase the adhesive force of the intermediate material 213, it is alternatively possible for the lens supporting frame 212 to be formed as a member adapted to absorb near-infrared light to generate heat. In this case, the laser beam is to be applied to the lens supporting frame 212 through the intermediate material 213. As a result, the lens supporting frame 212 generates heat to thereby heat the intermediate material 213. The heated intermediate material 213 is enhanced in adhesive force, and firmly fixes the lens 211 and the lens supporting frame 213 to each other. Further, there is no need for the intermediate material 213 to be a material absorbing near-infrared light, so the material for forming the intermediate material 213 can be selected from a wide range of selection.

The lens supporting frame 212 is formed of a thermoplastic resin material obtained by mixing a predetermined basic resin with a predetermined coloring material, such as carbon black, dye, or pigment, which serves to form the laser absorbing member. Owing to the mixing of the above coloring material, the lens supporting frame 212 conspicuously is to exhibit a near-infrared laser absorbing characteristic. Examples of the predetermined basic resin that can be used include polyamide (PA), such as nylon 6 (PA6) or nylon 66 (PA66), polyethylene (PE), polypropylene (PP), and styrene-acrylonitrile copolymer. Examples of the predetermined basic resin further include polyethylene terephthalate (PET), polystyrene, ABS, acryl (PMMA), polycarbonate (PC), polybutylene terephthalate (PBT), and PPS. Of those thermoplastic resins, polycarbonate is particularly suitable as the material for forming the lens supporting frame 212.

Further, it is also possible to use, as the material forming the lens supporting frame 212, a material obtained by reinforcing one of those thermoplastic resins with glass fibers, carbon fibers, etc. Further, it is possible for the resin to contain one or more of the following common additives in a range not interfering with the object of the present invention: an inorganic or an organic filler, such as glass, silica, talc, or calcium carbonate, an antistatic agent, a weathering resistance stabilizer, and wax.

Examples of the coloring material for the thermoplastic resin used for the lens supporting frame 212 include a carbon type material used as adjuvant, such as graphite, and an inorganic type coloring agent, such as a composite oxide type pigment. Further, it is also possible to use, as the coloring material, an organic coloring material if it exhibits sufficient absorptivity with respect to a laser beam. Examples of such a coloring material include a copper phthalocyanine type pigment.

It is desirable for the thermosplastic resin to exhibit a transmissivity of 5% or less with respect to the laser beam applied thereto. When the transmissivity of the thermoplastic resin exceeds 5%, the applied laser beam is transmitted therethrough, whereby the amount of laser beam energy absorbed by the resin material is reduced, and a laser beam energy loss is involved.

The material of the lens supporting frame 212 is not restricted to the above-mentioned ones; any material will do as long as it is capable of absorbing the laser beam as the heating source without allowing it to be transmitted therethrough.

When the lens supporting frame 212 is thus used as the heating source for heating the intermediate material 213, the lens supporting frame 212 may undergoes thermal deformation as a result of the heating by the laser beam. In this embodiment, however, the heating by the laser beam application is a local heating, so the lens supporting frame 212 is not deformed, and the mounting accuracy for the lens 211 is not adversely affected.

Further, while in this embodiment the intermediate material 213 is applied to either the lens supporting frame 212 or the lens 211, it is also possible to apply the intermediate material 213 to each of the lens supporting frame 212 and the lens 211.

Further, while in this embodiment, described above is a multi-point simultaneous irradiation using a plurality of laser beams, the laser application method is not restricted thereto; the same effect can be obtained by using some other method, for example, a method in which a laser beam is applied through scanning, or a method in which a ring-shaped laser beam is applied.

Further, while in this embodiment the lens 211, which is a convex lens, and the lens supporting frame 212 are fixed to each other, the lens configuration is not restricted to the convex one; it goes without saying that the same effect as that of this embodiment can be obtained in a case of a concave lens or a lens of some other configuration.

Tenth Embodiment

Figure 29A:
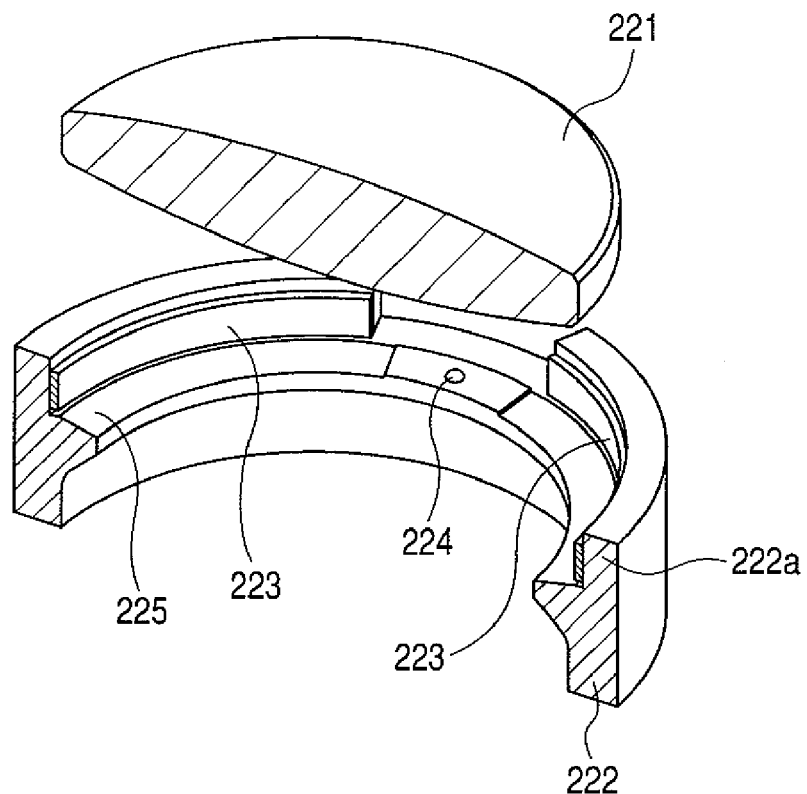
FIG. 29A is a perspective view of a lens fixed by the method of fixing an optical member of the second embodiment of the present invention and a lens supporting frame with an intermediate material applied thereto.
Figure 29B:
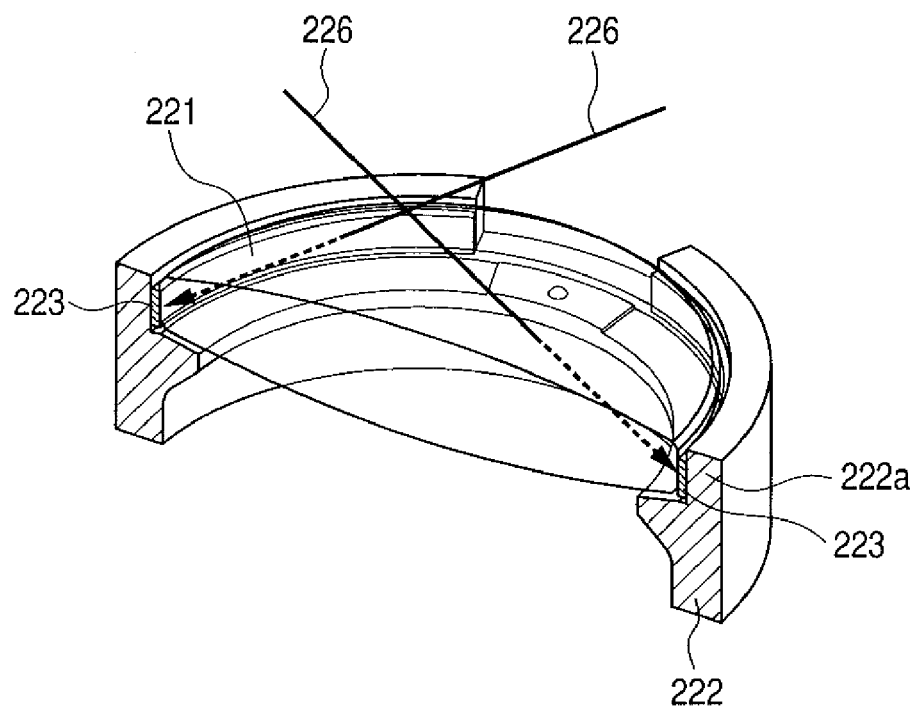
FIG. 29B is a perspective view showing how laser beams are applied to the intermediate material applied to the lens supporting frame with the lens of FIG. 29A incorporated therein.
Figure 30:
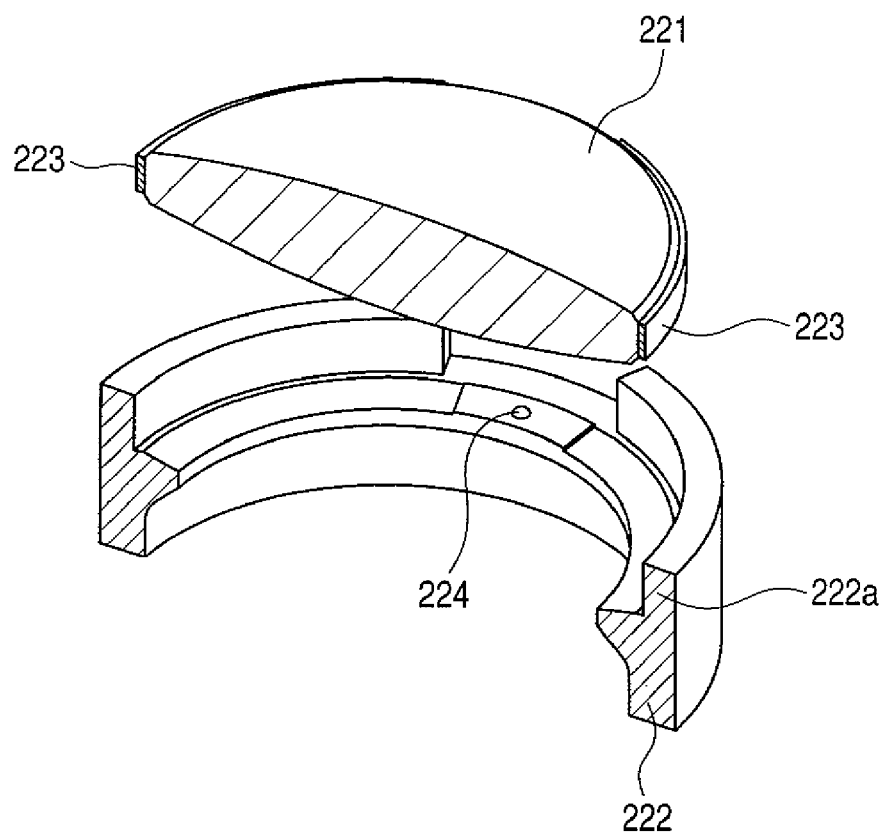
FIG. 30 is a perspective view of a lens with an intermediate material applied thereto and a lens supporting frame according to a tenth embodiment of the present invention.

Next, the tenth embodiment of the present invention will be described with reference to FIGS. 29A, 29B, and 30. FIG. 29A is a perspective view of a lens fixed by a method of fixing an optical member according to the tenth embodiment of the present invention and a lens supporting frame with an intermediate material applied thereto. FIG. 29B is a perspective view showing how laser beams are applied to the intermediate material applied to the lens supporting frame, into which the lens of FIG. 29A has been incorporated. FIG. 30 is a perspective view of the lens with the intermediate material applied thereto and the lens supporting frame in the tenth embodiment of the present invention.

This embodiment differs from the ninth embodiment in that the intermediate material is applied to the inner peripheral surface of the lens supporting frame. To be more specific, as shown in FIG. 29A, one end portion 222a of a lens supporting frame 222 constitutes a portion for performing positioning of a lens 221 in a direction perpendicular to the optical axis direction thereof with respect to the lens supporting frame 222. An intermediate material 223 is applied to the inner peripheral surface of the one end portion 222a of the lens supporting frame 222. Further, on the inner peripheral surface of the lens supporting frame 222, there is provided a step portion 225 protruding therefrom. Formed on the step portion 225 are a plurality of positioning portions 224 for performing positioning of the lens 221 in the optical axis direction thereof with respect to the lens supporting frame 222. Here, the lens 221, the lens supporting frame 222, and the intermediate material 223 are formed of materials similar to those of the ninth embodiment.

As shown in FIG. 29B, when fixing the lens 221 and the lens supporting frame 222 to each other, the lens 221 is first incorporated into the one end portion 222a of the lens supporting frame 222, to which the intermediate material 223 is previously applied. Then, positioning adjustment is performed on the lens 221 with respect to the lens supporting frame 222 by using a positioning adjustment tool. At this time, the lens 221 is being pressed in the optical axis direction against the lens supporting frame 222.

Next, a plurality of laser beams 226 having a near-infrared wavelength are applied from a laser irradiation device (not shown) at a predetermined angle with respect to the lens 221 so that they will reach the intermediate material 223 through the lens 221. The intermediate material 223 is adapted to absorb the laser beams 226 and generate heat. As a result of the heat generation of the intermediate material 223, the intermediate material 223 are brought into intimate contact with the lens 221 and the lens supporting frame 222 while undergoing fusion and thermal expansion. At this stage, the laser irradiation is completed.

When the laser irradiation is completed, the portion of the intermediate material 223 in contact with the lens 221 and the portion thereof in contact with the lens supporting frame 222 are instantaneously cooled to solidify and shrink. As a result, the intermediate material 223 functions as an adhesive, and the lens 221 and the lens supporting frame 222 are firmly fixed to each other through the intermediate material 223. Then, the pressurization of the lens 221 and the lens supporting frame 222 by the pressing device is canceled.

In this way, the lens 221 is positioned with high accuracy with respect to the lens supporting frame 222 and is firmly fixed thereto without involving any play therebetween.

While, in this embodiment, the intermediate material 223 is applied to the inner peripheral surface of one end portion 222a of the lens supporting frame 222, it is alternatively possible, for example, as shown in FIG. 30, to apply the intermediate material 223 to the outer peripheral edge portion of the lens 221. In this case, the lens 221 and the inner peripheral surface of the one end portion 222a of the lens supporting frame 222 are to be firmly fixed to each other. Further, a plurality of positioning portions 224 similar to those of the positioning portions 214 of the ninth embodiment are provided on the lens supporting frame 222.

Eleventh Embodiment

Figure 31:
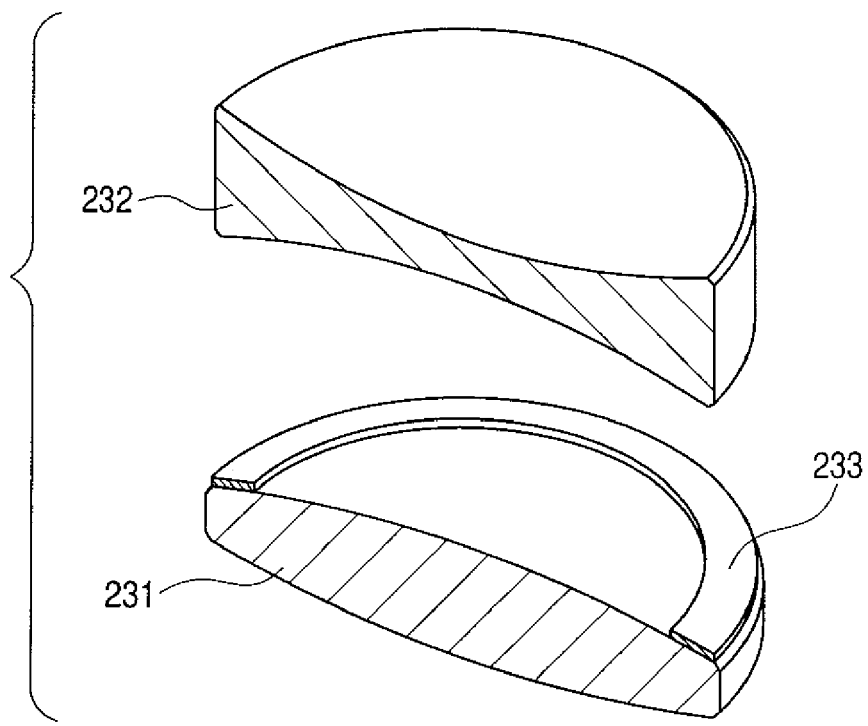
FIG. 31 is a perspective view of a first lens and a second lens fixed to each other by a method of fixing an optical member according to an eleventh embodiment of the present invention.
Figure 32:
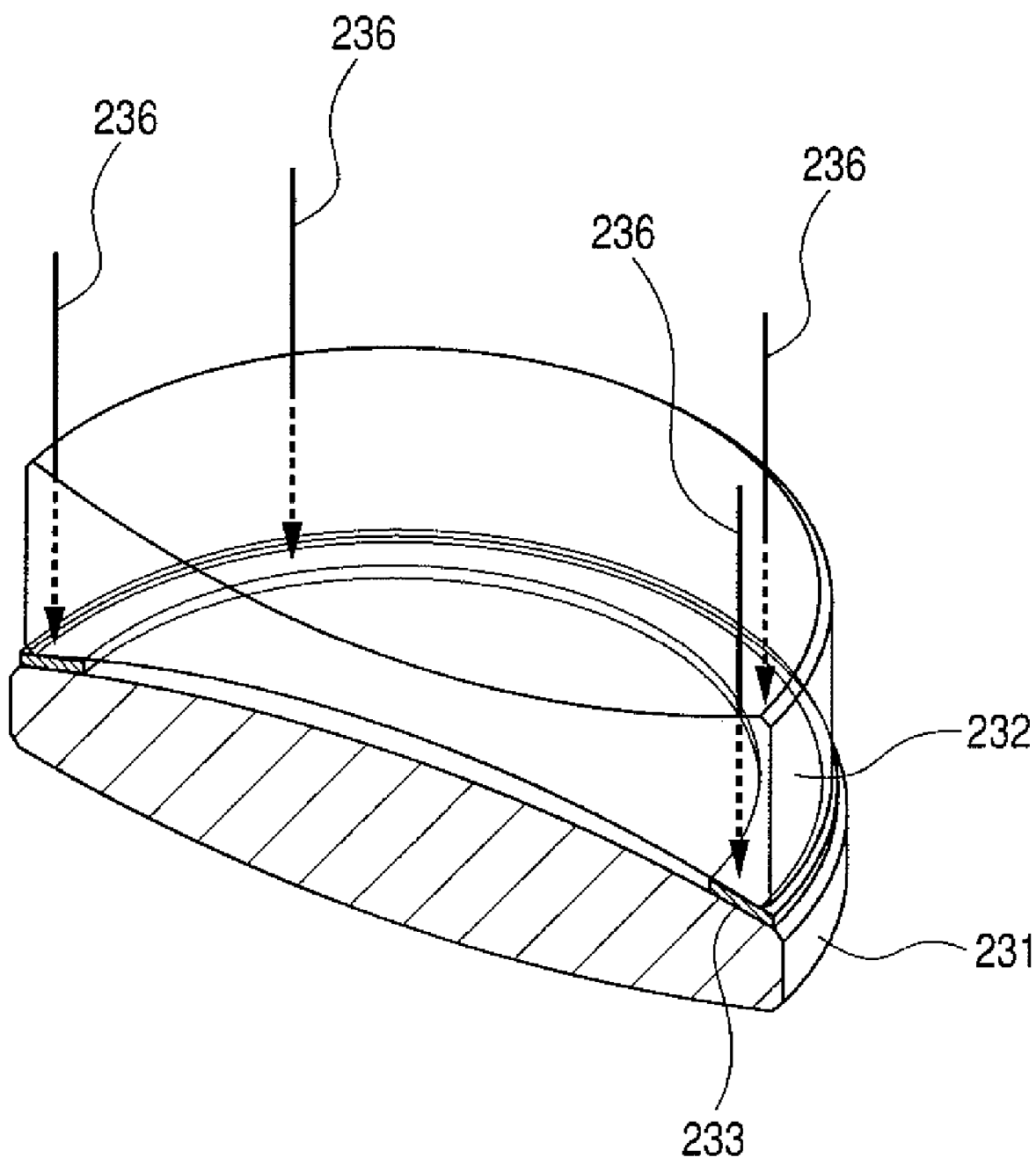
FIG. 32 is a perspective view showing how laser beams are applied to an intermediate material applied to the first lens of FIG. 31.

Next, the eleventh embodiment of the present invention will be described with reference to FIGS. 31 and 32. FIG. 31 is a perspective view of a first lens and a second lens fixed to each other by a method of fixing an optical member according to the eleventh embodiment of the present invention. FIG. 32 is a perspective view showing how laser beams are applied to an intermediate material applied to the first lens of FIG. 31.

As shown in FIG. 31, in this embodiment, a first lens 231, which is a convex lens, and a second lens 232, which is a concave lens, are superimposed on and fixed to each other. Here, an intermediate material 233 is applied to an edge portion of the first lens 231 so as to form, between the opposing surfaces of the first lens 231 and the second lens 232, a ring with a predetermined width extending along the edge portion by using a printing technique, such as padding or a dispenser. The intermediate material 233 is formed of a material similar to that of the intermediate material 213 of the ninth embodiment. Thus, the intermediate material 233 has characteristics of exhibiting an increase in adhesive force when heat is imparted thereto, absorbing near-infrared light to generate heat, and effecting light shielding on visible light. Further, due to the above-mentioned visible light shielding characteristic, the intermediate material 233 functions as an optical stop for shielding a reflected harmful light beam from, for example, a peripheral portion other than image taking light beams. At the time of its application to the lens 231, the intermediate material 233 is liquid, and after a predetermined period of time has elapsed, the intermediate material 233 solidifies. Thus, at the time of incorporation of the first lens 231 and the second lens 232, the intermediate material 233 is solid.

Next, the procedures for fixing the first lens 231 and the second lens 232 to each other will be illustrated.

First, as shown in FIG. 32, the first lens 231, to which the intermediate material 233 is applied, and the second lens 232 are superimposed one upon the other. Then, the first lens 231 and the second lens 232 are fixed to each other, with the intermediate material 233 being in intimate contact with the second lens 232, by a pressing device (not shown). At this time, positioning is performed on the first lens 231 with respect to the second lens 232 by a positioning tool such that their respective optical axes are aligned with each other.

With the first lens 231 positioned with respect to the second lens 232, a plurality of laser beams 236 are applied from a laser irradiation device. Each laser beam 236 reaches the intermediate material 233 through the first lens 231. The intermediate material 233 absorbs the laser beams 236 and generates heat. Due to this heat, the adhesive force of the intermediate material 233 is augmented, and the first lens 231 and the second lens 232 are fixed to each other by this adhesive force. When the laser beams 236 have been applied for a predetermined period of time, the application of the laser beams 236 ends.

While, in this embodiment, the laser irradiation is effected on the intermediate material 233 from the second lens 232 side through the second lens 232, it is also possible to perform the laser irradiation on the intermediate material 233 from the first lens 231 side through the first lens 231.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application Nos. 2004-376819 filed Dec. 27, 2004, 2004-380786 filed Dec. 28, 2004, and 2005-266993 filed Sep. 14, 2005 which are hereby incorporated by reference herein in their entirety.

What is claimed is:

1. A method of fixing an optical member for fixing a second lens to a first lens, the method comprising:
   a) a step of disposing, on the first lens, an intermediate member that contains a material which generates heat by being irradiated with light and a material whose adhesive strength increases by a generation of heat;
   b) a first irradiating step of irradiating light that is transmitted to the intermediate member disposed on the first lens;
   c) a step of adjusting a position of the second lens with respect to the first lens so that the intermediate member is disposed between the first lens and the second lens; and
   d) a second irradiating step of irradiating light that is transmitted through one of the first lens and the second lens onto the intermediate member disposed between the first lens and the second lens,
   wherein a portion irradiated with the light in the first irradiating step and a portion irradiated with the light in the second irradiating step are different from each other,
   whereby the intermediate member generates heat for the intermediate member to be fused to fix the second lens to the first lens.

2. A method of fixing the optical member according to claim 1, wherein the intermediate member is three-dimensionally formed along a shape of a surface of a light incidence/emission plane of the first lens and a light incidence/emission plane of the second lens.

3. An optical unit comprising:
   a) a first lens;
   b) a second lens; and
   c) an intermediate member that is disposed between the first lens and the second lens, contains a material which generates heat and a material whose adhesive strength increases by a generation of heat, and generates heat for the intermediate member to be fused by being irradiated with light,
   wherein the intermediate member is fixed to the first lens by a primary irradiation in which the intermediate member is disposed on the first lens and is irradiated with a light,
   wherein the intermediate member is fixed to the second lens by a secondary irradiation in which a position of the second lens is adjusted to dispose the intermediate member between the first lens and the second lens, and the intermediate member is irradiated with a light that is transmitted through one of the first lens and the second lens, and
   wherein a portion irradiated with the light by the primary irradiation and a portion irradiated with the light by the secondary irradiation are different from each other.

4. An optical unit according to claim 3, wherein the intermediate member is three-dimensionally formed in a shape along a shape of a surface of a light incidence plane and a light emission plane of the first lens and a light incidence plane and a light emission plane of the second lens.

* * * * *